（12） United States Patent
Tsao

(10) Patent No.: US 8,281,120 B2
(45) Date of Patent: Oct. 2, 2012

(54) SENDING SIGNED E-MAIL MESSAGES FROM A DEVICE

(75) Inventor: Yeongtau Louis Tsao, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 565 days.

(21) Appl. No.: 12/541,896

(22) Filed: Aug. 14, 2009

(65) Prior Publication Data

US 2011/0040978 A1    Feb. 17, 2011

(51) Int. Cl.
*H04L 29/06*    (2006.01)
*H04L 9/32*    (2006.01)
(52) U.S. Cl. ........................................ 713/150; 713/181
(58) Field of Classification Search ........................ None
See application file for complete search history.

(56) References Cited

U.S. PATENT DOCUMENTS

| | | | | |
|---|---|---|---|---|
| 5,889,943 | A * | 3/1999 | Ji et al. | 726/22 |
| 6,052,743 | A * | 4/2000 | Schwan et al. | 710/23 |
| 6,327,656 | B2 * | 12/2001 | Zabetian | 713/176 |
| 6,609,200 | B2 * | 8/2003 | Anderson et al. | 713/176 |
| 6,732,101 | B1 * | 5/2004 | Cook | 1/1 |
| 6,895,507 | B1 * | 5/2005 | Teppler | 726/19 |
| 7,082,538 | B2 * | 7/2006 | Bouchard et al. | 713/181 |
| 7,363,495 | B2 * | 4/2008 | Felt et al. | 713/170 |
| 7,707,624 | B2 * | 4/2010 | Tomkow | 726/5 |
| 2003/0074552 | A1 * | 4/2003 | Olkin et al. | 713/150 |

OTHER PUBLICATIONS

RFC 3850, "S/MIME Version 3.1 Certificate Handling", dated Jul. 2004.
RFC 3851, "S/MIME Version 3.1 Message Specification", dated Jul. 2004.
RFC 3852, "Cryptographic Message Syntax (CMS)", dated Jul. 2004.
"JavaMail™ API Design Specification", Version 1.4, Sun Microsystems Inc., Dec. 2005.
"JavaMail™ Guide for Service Providers", Revision 01, Sun Microsystems Inc., Aug. 1998.
"JavaMail API documentation", JavaMail 1.3.3, available at <http http://java.sun.com/products/javamail/javamail-1_3_1.html>, Sun Microsystems Inc., Jun. 27, 2003.
RFC 822, "Standard for ARPA Internet Text Messages", dated Aug. 1982.
RFC 2045, "Multipurpose Internet Mail Extensions(MIME) Part One: Format of Internet Message Bodies", dated Nov. 1996.
Calder, et. al, "JavaBeans™ Activation Framework Specification", Version 1.0a, Sun Microsystems Inc., May 27, 1999.
JavaBeans Activation Framework 1.0.2 API documentation, available at <http http:// http://java.sun.com/products/archive/javabeans/jaf102.html>, Sun Microsystems Inc., 2002.

(Continued)

*Primary Examiner* — William Powers
(74) *Attorney, Agent, or Firm* — Fitzpatrick, Cella, Harper & Scinto

(57) ABSTRACT

Sending signed e-mail messages. An output data stream is created for streaming a signed e-mail message, and streamed attachment data is read. In response to receiving a portion of the read streamed attachment data, the received portion of the attachment data is digested to generate a digest value, and the received portion of the attachment data is sent to a mail server via the output data stream. The received portion of the attachment data is smaller than the size of the attachment data. The digest value is updated as additional portions of the streamed attachment data are received and digested. In response to sending all attachment data to the mail server, a signer generates the signature data by signing the digest value using a signer's private key, and the generated signature data is sent to the mail server via the output stream.

56 Claims, 16 Drawing Sheets

OTHER PUBLICATIONS

Oracle Security Developer Tools S/MIME Java API Reference 10g Release 3 (10.1.3), available at <http://download.oracle.com/docs/cd/B31017_01/security.1013/b25379/toc.htm>, Oracle, 2006.

Bouncy Castle Library 1.41 API Specification, The Legion of the Bouncy Castle, available at <http://www.bouncycastle.org>, 2008.

Enhydra-Oyster Project, Together Teamlösungen EDV-Dienstleistungen GmbH, available at <http://www.enhydra.org/tech/oyster/>, 2006.

Enhydra-Oyster 2.1-7 API, Together Teamlösungen EDV-Dienstleistungen GmbH, available at <http://www.enhydra.org/tech/oyster/>, 2007.

* cited by examiner

SENDING SIGNED E-MAIL MESSAGES FROM A DEVICE

FIELD

The present disclosure relates to sending signed e-mail messages from a device, and more particularly relates to sending streamed data from a device using a secure e-mail exchange format.

BACKGROUND

In the field of e-mail messaging, formats for secure e-mail exchange have been proposed that permit signing of e-mail messages and their attachments. One such secure e-mail exchange format is defined by the secure MIME (S/MIME) standard for public key signing and encrypting of e-mail messages encapsulated in MIME (Multipurpose Internet Mail Extensions) using a PKI (Public Key Infrastructure). The PKI provides an S/MIME system with public key certificates that bind together an identity with a public key used to sign and/or encrypt an e-mail message, including any attachments.

To sign a message, a message sender uses the sender's private key (which is stored in a secure location) to encrypt a hash of the message and then send the message along with the sender's certificate (or a list of certificates for validating the validity of the certificate), which contains the sender's public key information. The recipient uses the received public key in the certificate to verify the message's digital signature.

To encrypt a message, a message sender obtains the recipient's public key, and uses the recipient's public key to encrypt the message and send the message, along with the recipient's certificate, to a receiver. The recipient will use the recipient's private key (which is stored securely somewhere that the recipient can access) to decrypt the message.

Some secure e-mail exchange formats allow for creation and formatting of a signed-only message and an enveloped (encrypted)-only message. In addition, these formats specify that signing and encrypting operations can be applied in any order. For example, signing can be performed before encrypting to create a signed-first-then-encrypted (signed-and-encrypted) message. Also, encrypting can be performed before signing to create an encrypted-and-signed) message.

As one example of a secure e-mail exchange format, and as specified by the S/MIME standard, a signed-only S/MIME message (clear-signed) contains a MIME body part that contains a MIME entity (i.e., the message content and attachment data) and a separate MIME body part that contains a signature (PKCS7 signature data). The MIME entity included in the message is signed by virtue of the separate signature that is included in the message. Before adding the signature to the signature MIME body part, Base64 transfer encoding is applied to the signature. The signature MIME body part has an "application/pkcs7-signature" content type, and a Base64 content transfer encoding.

The S/MIME standard is defined at RFC 3851, "S/MIME Version 3.1 Message Specification", dated July 2004 (which obsoletes RFC 2633), RFC 3850, "S/MIME Version 3.1 Certificate Handling", dated July 2004 (which obsoletes RFC 2632), and RFC 3852, "Cryptographic Message Syntax (CMS)", dated July 2004 (which obsoletes RFC 3369, and is updated by RFC 4853), the contents of which are incorporated by reference herein These secure e-mail exchange formats often specify that the signature (PKCS7 signature data, in the case of the S/MIME format) is created by using a digest algorithm to calculate a message digest for the entity that is to be signed, and then encrypting (i.e., signing) the message digest value using the signer's private key. The message digest value is the signature (again, PKCS7 signature data, in the case of the S/MIME format).

Because the clear-signed message includes a signature that is separate from the signed entity (i.e., the message content and attachment data), and because the signature is created using a message digest of the signed entity, a typical transmission of secure e-mail is often compelled to access attachment data twice. For example, the S/MIME system accesses the attachment data a first time to generate the attachment data to be sent, and the S/MIME system accesses the attachment data a second time to generate the message digest that is used to generate the signature.

When sending an attachment file with e-mail messages, secure e-mail systems typically read the entire attachment file into a memory buffer before generating and sending the e-mail message, to facilitate access to the attachment data. Examples of S/MIME systems that exhibit such behavior are believed to include Oyster S/MIME Open Source lib.

SUMMARY

One problem with known e-mail systems that read the entire attachment file (or files) into a memory buffer is that the size of attachment files may be limited by the size of the memory buffer. Therefore, a large memory buffer may be needed to send e-mail messages having large attachment files. Moreover, typical e-mail systems use the Java Virtual Machine (JVM), which limits the memory buffer size to around 30 MB.

To avoid limits on in-memory size when generating e-mail messages containing attachments, e-mail systems that use the Bouncy Castle S/MIME library create an attachment file, and read the attachment file twice. The attachment file is read a first time to generate an attachment body part of the e-mail message using attachment data contained in the attachment file. The attachment file is read a second time to generate a digital signature body part of the e-mail message. In particular, during the second read, a hash value is calculated, that hash value is signed, and the signed hash value is used as the digital signature, which is added to the digital signature body part of the e-mail message.

One problem with secure e-mail systems that read each attachment file twice is that it may be difficult to sign a partially sent e-mail message. In particular, if only part of an attachment file is read during the first read operation, the same portion of the attachment file read during the first read operation should also be read during the second read operation, so that the appropriate hash value for the digital signature is generated. However, it may be difficult to determine when to stop reading the attachment file during the second read operation.

Furthermore, it may be difficult to send real-time data (i.e., data that is generated and not saved) using a secure e-mail system that reads each attachment file twice, because the real-time data may only be available during the first read operation.

The foregoing situation is addressed by reading streamed attachment data from a streaming data source one time, and by digesting the streaming attachment data at the time when the attachment data is being sent to a recipient.

Thus, in an example embodiment described herein, a signed e-mail message is sent to a mail server from a device that communicates with the mail server over a network. The signed e-mail message has attachment data and signature data. Signer information, recipient information and attachment information are received. The signer information, recipient information, and attachment information are packaged into an e-mail message having a clear-signed secure e-mail exchange format that includes an attachment body part and a signature body part. The attachment body part contains the location of at least one attachment file included in the attachment information. The signature body part contains the signer information for generating the digital signature. An output data stream is created for streaming the e-mail message from the device to a mail server specified by the recipient information. The attachment body part is processed to acquire at least one input data stream for the at least one attachment file location contained in the attachment body part. Attachment data is read from the at least one input data stream, and in response to receiving a portion of the read streamed attachment data from the at least one input data stream, the received portion of the attachment data is digested to generate a digest value, and the received portion of the attachment data is sent to the mail server via the output data stream. The received portion of the attachment data is smaller than the size of the attachment data, and the digest value is updated as additional portions of the streamed attachment data are received and digested. In response to sending all attachment data specified by the attachment information to the mail server, the signature body part is processed to acquire a signer specified by the signer information contained in the signature body part, the signer generates the signature data by signing the digest value using a signer private key, and the generated signature data is sent to the mail server via the output data stream.

The foregoing arrangement is particularly advantageous in situations where it may not be possible to read and digest an entire attachment file all at once due to the size of the attachment file. Because attachment data is streamed, a large attachment file can be sent in a signed e-mail message, even if the entire attachment file cannot be read and digested all at once.

Because attachment data is digested on-the-fly as it is being streamed from the file locations, the attachment data can be read once. Because the attachment data can be read once, and a digest value is updated as additional portions of the streamed attachment data are received and digested, it is possible to sign a partially sent e-mail message. Moreover, because attachment data is read once, performance can be improved, as compared to an e-mail system in which attachment data is read more than once. Furthermore, because attachment data is read once, it is possible to send real-time data that might not be available after the first read operation is performed.

In example embodiments, the e-mail message has an S/MIME format, and the signature has a PKCS7 content type. The signer can include at least one of a secure e-mail library module, an application module, and a smart card. The received portion of the attachment data can be encrypted before being sent to the mail server via the output data stream.

The device can include a multi-function printer (MFP), wherein the streamed attachment data is generated by at least one of a scan operation and a copy operation of the MFP. The attachment body part can contain signer's digest algorithm information specified by the signer information. The received portion of the attachment data can be digested using a digest algorithm, wherein the digest algorithm includes at least one of an MD5 (Message-Digest algorithm 5) digest algorithm, a Secure Hash Algorithm (SHA)-1 digest algorithm, and an SHA-2 digest algorithm, wherein the SHA-2 digest algorithm includes at least one of an SHA-224 digest algorithm, an SHA-256 digest algorithm, an SHA-384 digest algorithm, and an SHA-512 digest algorithm.

Responsive to a cancel instruction issued by a user of the device in the midst of the scan operation, the signer can generate the signature data, and the generated signature data can be sent to the mail server via the output data stream. As such, a partially sent e-mail message is signed, in correspondence to the information scanned so far in the interrupted scan operation. Information can be added to the message content of the partially sent e-mail message to indicate that the message is a partially sent e-mail message. Information can be added to the attachment data of the partially sent e-mail message to indicate that the message is a partially sent e-mail message, wherein if the message includes a plurality of attachment files, the information is added to the attachment file that is partially sent. Additional information indicating that the message is a partially sent e-mail message can be added to the partially sent e-mail message as a new attachment.

The JavaMail API and Java Activation Framework (JAF) can be used to send the signed e-mail message.

The received portion of the read attachment data can be buffered in a memory buffer, wherein a capacity of the memory buffer is smaller than a size of the attachment data specified by the attachment information, and wherein after the buffered portion of the attachment data is digested and sent to the mail server, additional portions of the streamed attachment data are buffered in the memory buffer.

This brief summary has been provided so that the nature of this disclosure may be understood quickly. A more complete understanding can be obtained by reference to the following detailed description and to the attached drawings.

DETAILED DESCRIPTION

Figure 1:
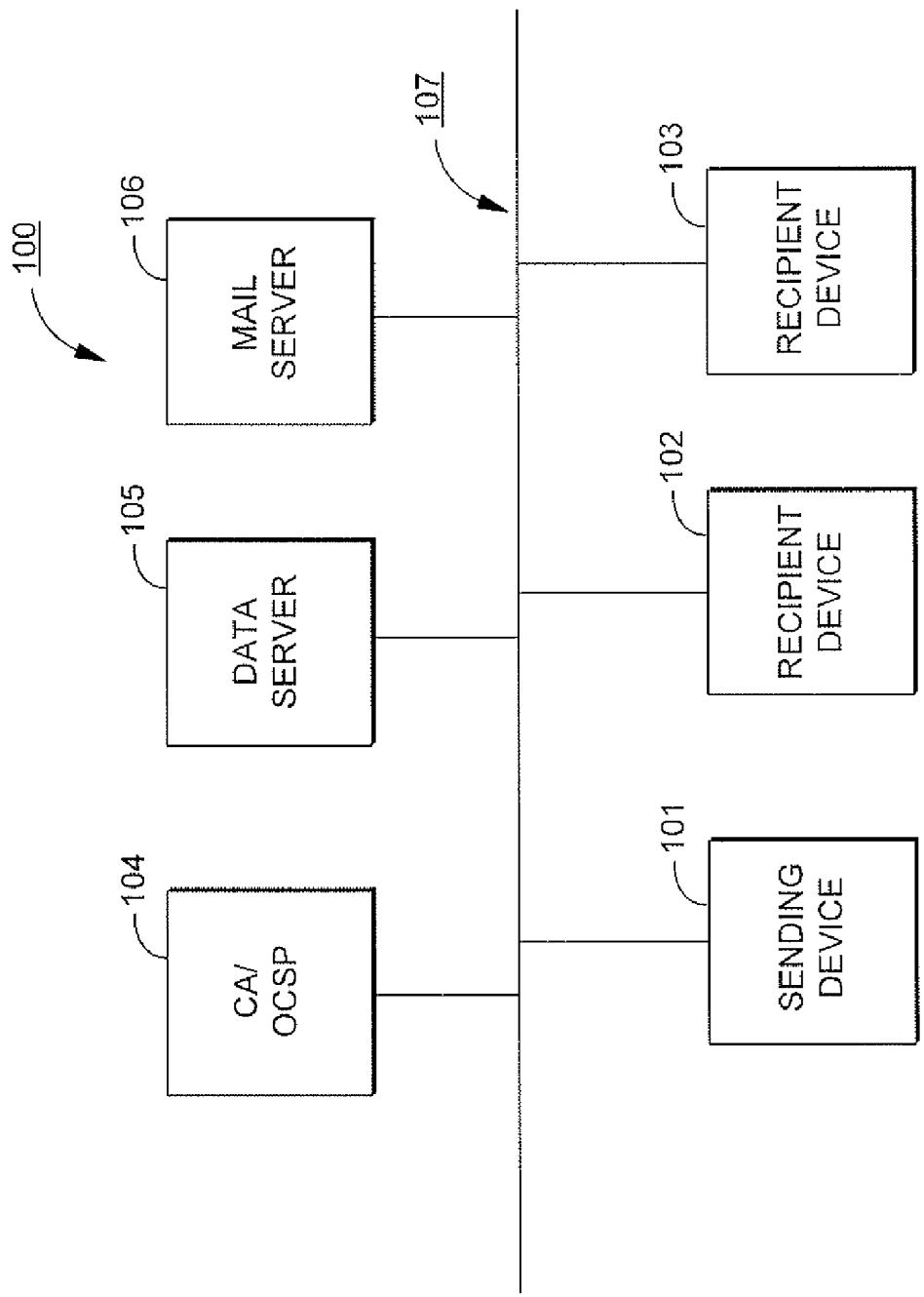
FIG. 1 is a representative view of an e-mail system relevant to one example embodiment.

FIG. 1 is a representative view of an e-mail system relevant to one example embodiment. As shown in FIG. 1, e-mail system 100 includes sending device 101, recipient devices 102 and 103, data server 105, Certificate Authority (CA) and Online Certificate Status Protocol (OCSP) server 104, and mail server 106, which are all interconnected via network 107.

Mail server 106 is a computer that executes an e-mail server application, such as, for example, Microsoft Exchange Server, Sendmail e-mail server, or any other suitable type of e-mail server application.

Data server 105 is a computer that executes a data server application, such as, for example, a file server application, a web server application, a database server application, a media server application, or any other suitable type of data server application.

Network 107 is an intranet, but in other embodiments, network 107 can be the Internet, or any other suitable type of network for sending e-mail messages.

Certificate Authority (CA) and Online Certificate Status Protocol (OCSP) server 104 is a computer that executes a Certificate Authority server application and an OCSP server application.

Sending device 101 is a device that executes an e-mail client application that generates and sends signed e-mail messages having a clear-signed secure e-mail exchange format to recipient devices 102 and 103 via mail server 106. In the example embodiment, the secure e-mail exchange format is an S/MIME format, however, in other embodiments, the secure e-mail exchange format can be any other suitable type of secure e-mail exchange format. In other embodiments, the sending device is also a recipient device that executes an e-mail client application that receives S/MIME e-mail messages from mail server 106. In the example embodiment, sending device 101 is a multi-function printer (MFP), but in other embodiments, sending device 101 can be any other type of device that sends e-mail messages, such as, for example, a computer, a scanner, a copy machine, a facsimile machine, a printer, a personal digital assistant (PDA), a mobile telephone, a handheld device, or the like.

Recipient devices 102 and 103 are devices that each executes an e-mail client application that receives S/MIME e-mail messages from mail server 106. In other embodiments, the recipient devices are also sending devices that execute an e-mail client application that generates and sends signed S/MIME e-mail messages to recipient devices via mail server 106.

In the example embodiment shown in FIG. 1, sending device 101, recipient devices 102 and 103, data server 105, Certificate Authority (CA) and Online Certificate Status Protocol (OCSP) server 104, and mail server 106 are shown to be separate devices. However, in other embodiments, any combination of the functions of sending device 101, recipient devices 102 and 103, data server 105, Certificate Authority (CA) and Online Certificate Status Protocol (OCSP) server 104, and mail server 106 may be performed by one or more devices. For example, in other embodiments, an e-mail server application and a data server application may be executed by the same computer.

In the example embodiment shown in FIG. 1, sending device 101, recipient devices 102 and 103, data server 105, Certificate Authority (CA) and Online Certificate Status Protocol (OCSP) server 104, and mail server 106 are shown to be connected through one network. However, sending device 101, recipient devices 102 and 103, data server 105, Certificate Authority (CA) and Online Certificate Status Protocol (OCSP) server 104, and mail server 106 may be connected through more than one network.

Figure 2:
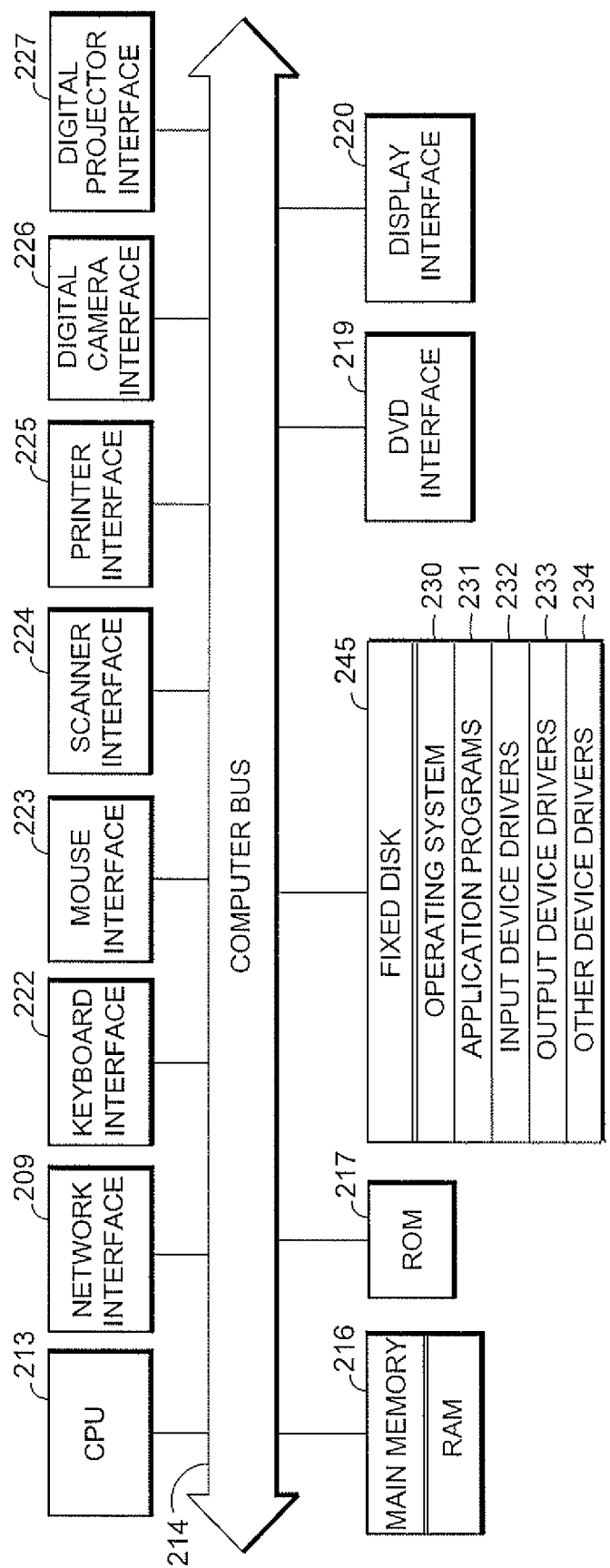
FIG. 2 is a detailed block diagram showing the internal architecture of a computer.

FIG. 2 is a detailed block diagram showing the internal architecture of a computer, such as any one of recipient devices 102 and 103, data server 105, Certificate Authority (CA) and Online Certificate Status Protocol (OCSP) server 104, and mail server 106. As shown in FIG. 2, the computer includes central processing unit (CPU) 213 which interfaces with computer bus 214. Also interfacing with computer bus 214 are hard disk 245, network interface 209, random access memory (RAM) 216 for use as a main run-time transient memory, read only memory (ROM) 217, DVD disk interface 219, display interface 220 for a monitor, keyboard interface 222 for a keyboard, mouse interface 223 for a pointing device, scanner interface 224 for a scanner, printer interface 225 for a printer, digital camera interface 226 for a digital camera, and digital projector interface 227 for a digital projector.

RAM 216 interfaces with computer bus 214 so as to provide information stored in RAM 216 to CPU 213 during execution of the machine-executable instructions in software programs such as an operating system, application programs, and device drivers. More specifically, CPU 213 first loads computer-executable process steps (encoded in machine-executable instructions) from fixed disk 245, or another storage device into a region of RAM 216. CPU 213 can then execute the stored process steps from RAM 216 in order to execute the loaded computer-executable process steps. Data such as color images or other information can be stored in RAM 216, so that the data can be accessed by CPU 213 during the execution of computer-executable software programs (encoded in machine-executable instructions), to the extent that such software programs have a need to access and/or modify the data.

As also shown in FIG. 2, hard disk 245 contains operating system 230, and application programs 231 (encoded in machine-executable instructions), such as e-mail server applications, file server applications, web server applications, database server applications, media server application, Certificate Authority server applications, OCSP server applications, and e-mail client applications. Hard disk 245 also contains device drivers for software interface to devices, such as input device drivers 232, output device drivers 233, and other device drivers 234.

Figure 3:
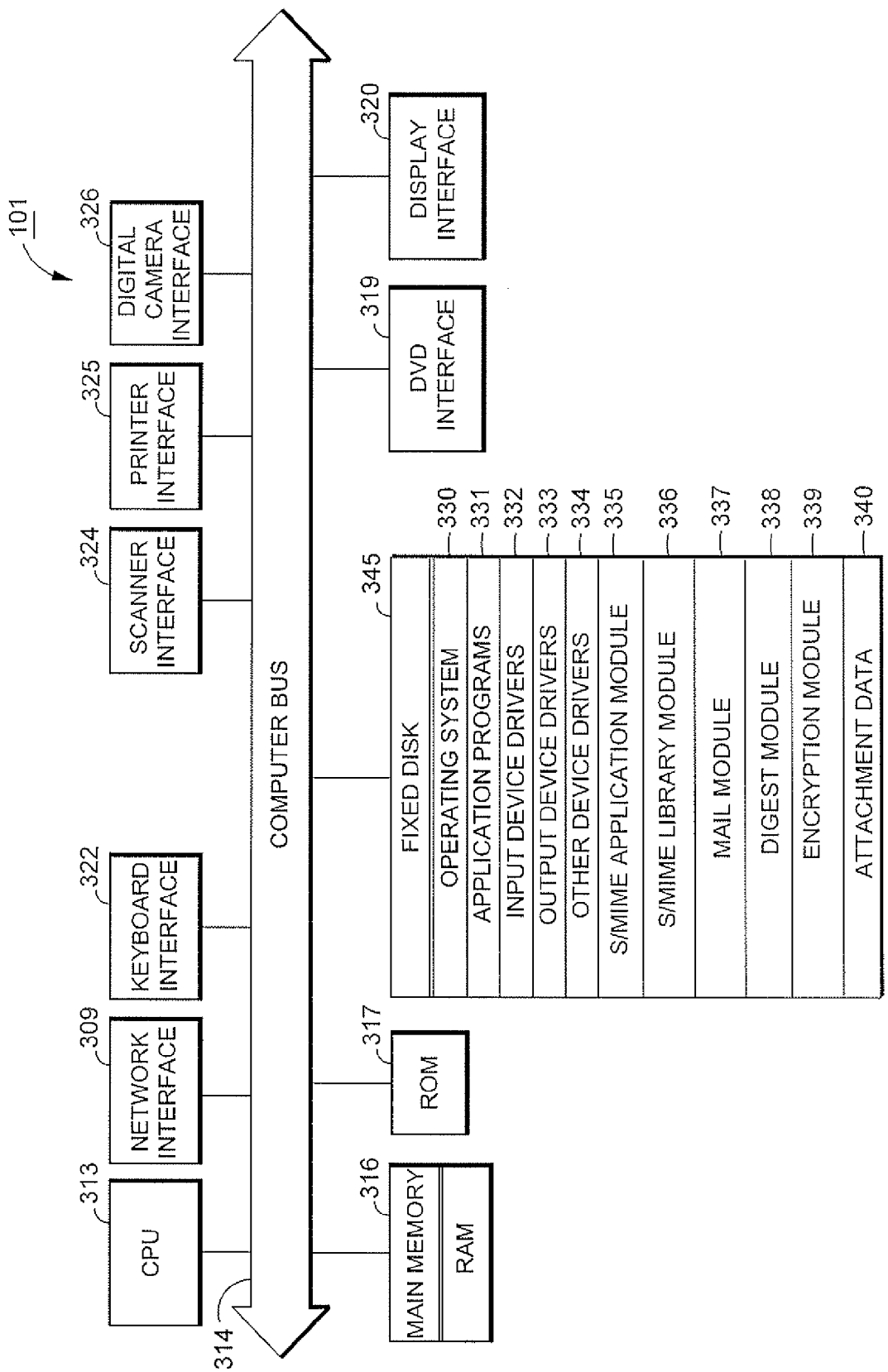
FIG. 3 is a detailed block diagram depicting the internal architecture of the message sending device shown in FIG. 1.

FIG. 3 is a detailed block diagram showing the internal architecture of sending device 101. As shown in FIG. 3, sending device 101 includes central processing unit (CPU) 313 which interfaces with computer bus 314. Also interfacing with computer bus 314 are hard disk 345, network interface 309, random access memory (RAM) 316 for use as a main run-time transient memory, read only memory (ROM) 317, DVD disk interface 319, display interface 320 for a display, keyboard interface 322 for a keyboard, scanner interface 324 for a scanner, printer interface 325 for a printer, and digital camera interface 326 for a digital camera.

RAM 316 interfaces with computer bus 314 so as to provide information stored in RAM 316 to CPU 313 during execution of the machine-executable instructions in software programs such as an operating system, application programs, and device drivers. More specifically, CPU 313 first loads computer-executable process steps (encoded in machine-executable instructions) from fixed disk 345, or another storage device into a region of RAM 316. CPU 313 can then execute the stored process steps from RAM 316 in order to execute the loaded computer-executable process steps. Data such as color images or other information can be stored in RAM 316, so that the data can be accessed by CPU 313 during the execution of computer-executable software programs (encoded in machine-executable instructions), to the extent that such software programs have a need to access and/or modify the data.

As also shown in FIG. 3, hard disk 345 contains operating system 330, application programs 331 (encoded in machine-executable instructions). Hard disk 345 also contains device drivers for software interface to devices, such as input device drivers 332, output device drivers 333, and other device drivers 334. Hard disk 345 also contains S/MIME application module 335, S/MIME library module 336, mail module 337, digest module 338, and encryption module 339.

S/MIME application module 335 comprises computer-executable process steps (encoded in machine-executable instructions) for an e-mail client application that generates and sends signed S/MIME e-mail messages by calling S/MIME library module 336.

S/MIME library module 336 comprises computer-executable process steps (encoded in machine-executable instructions) executed by CPU 313 for sending a signed e-mail message from sending device 101 to recipient devices (e.g., 102 and 103) via network 107, the signed e-mail message having attachment data and PKCS7 signature data, wherein the e-mail message has an S/MIME format.

S/MIME library module 336 generally comprises computer-executable process steps (encoded in machine-executable instructions) that receive signer information, recipient information and attachment information from S/MIME application module 335. S/MIME library module 336 creates an e-mail message using the received signer information, recipient information and attachment information, and calls mail module 337 to create an output data stream for streaming the e-mail message from sending device 101 to a mail server specified by the recipient information (e.g., mail server 106), and connected to sending device 101 via network 107. In response to receiving the output data stream from mail module 337, S/MIME library module 336 reads streamed attachment data specified by the attachment information (e.g., attachment data 340, attachment data stored in data server 105, or real-time attachment data received from, for example, a scanner via scanner interface 324). In response to receiving a portion of the read streamed attachment data, S/MIME library module 336 digests the received portion of the attachment data to generate a digest value (using digest module 338), and sends the received portion of the attachment data to the mail server via the output data stream, wherein the received portion of the attachment data is smaller than the size of the attachment data, and wherein the digest value is updated as additional portions of the streamed attachment data are received and digested.

In response to sending all attachment data specified by the attachment information to the mail server, a signer specified by the signer information generates the PKCS7 signature data by signing the digest value using a signer's private key. In the example embodiment, the signer is digest module 338, however, in other embodiments, the signer can be, for example S/MIME application module 335, a smart card, or any other suitable type of signer that generates the PKCS7 signature data by signing the digest value using a signer's private key. S/MIME library module sends the generated PKCS7 signature data to the mail server via the output data stream.

In the example embodiment, digest module 338 comprises computer-executable process steps (encoded in machine-executable instructions) for an MD5 (Message-Digest algorithm 5) digest algorithm, however, in other embodiments, digest module 338 can comprise computer-executable process steps (encoded in machine-executable instructions) for a Secure Hash Algorithm (SHA)-1 digest algorithm, and instructions for an SHA-2 family algorithm (e.g., an SHA-224 digest algorithm, an SHA-256 digest algorithm, an SHA-384 digest algorithm, and an SHA-512 digest algorithm).

Mail module 337 comprises computer-executable process steps (encoded in machine-executable instructions) executed by CPU 313 for supporting e-mail client functionality.

Encryption module 339 comprises computer-executable process steps (encoded in machine-executable instructions) for encrypting data using a public key.

Figure 4:
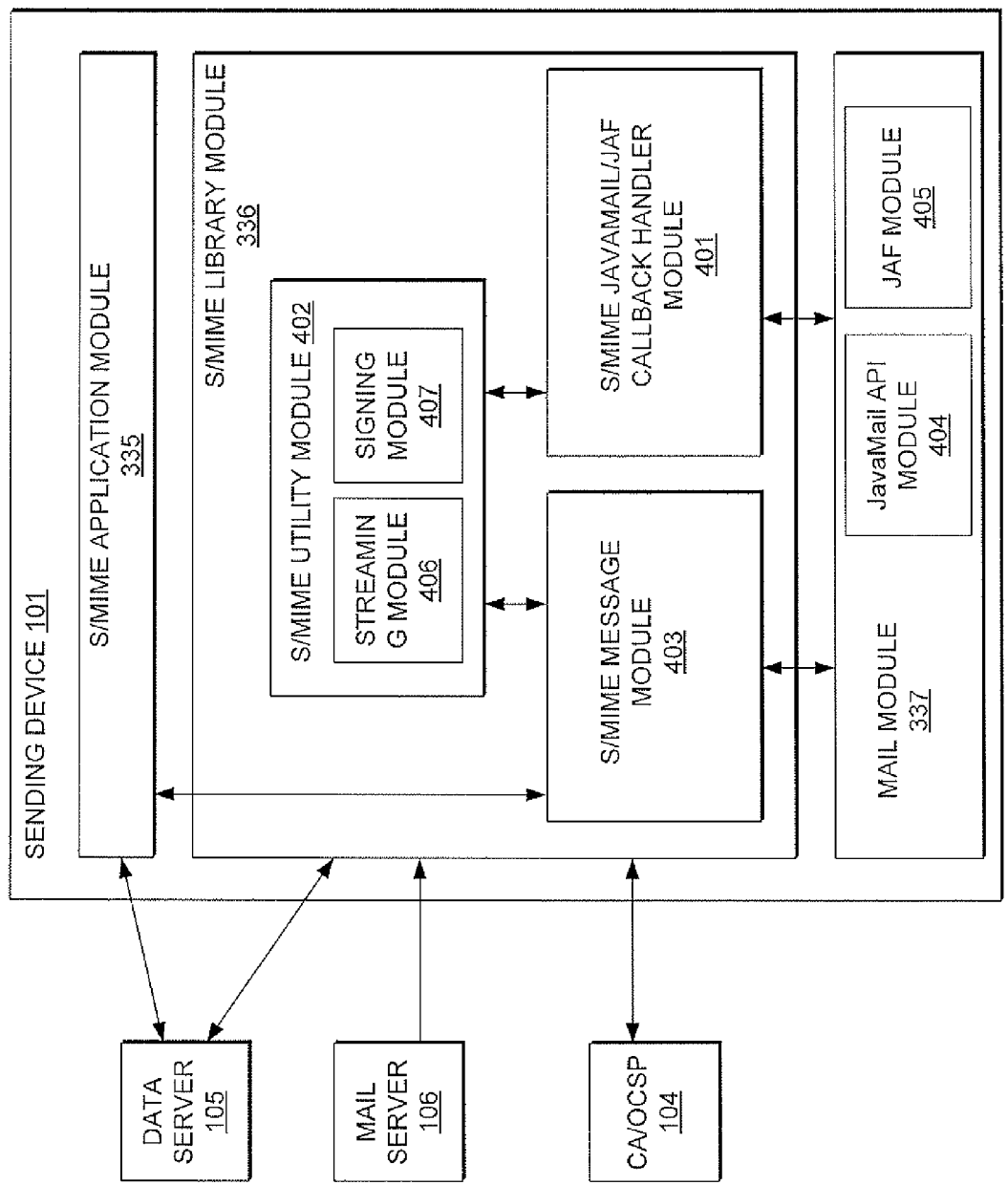
FIG. 4 is a view for explaining software architecture of the message sending device shown in FIG. 1.

FIG. 4 is a view for explaining software architecture of sending device 101 shown in FIG. 1. As shown in FIG. 4, sending device 101 includes S/MIME application module 335, S/MIME library module 336, and mail module 337.

S/MIME application module 335 is an e-mail client application that generates and sends signed S/MIME e-mail messages by calling S/MIME library module 336 to create and send an S/MIME message using mail module 337.

In the example embodiment, mail module 337 is a platform and protocol independent mail module. In particular, mail module 337 is a Java-based mail module that includes JavaMail API module 404 and JavaBeans Activation Framework (JAF) module 405.

JavaMail API module 404 provides a set of abstract Java classes and interfaces for supporting e-mail client functionality. The JavaMail API is described in "JavaMail™ API Design Specification", Version 1.4, Sun Microsystems Inc., December 2005, and "JavaMail™ Guide for Service Providers", Revision 01, Sun Microsystems Inc., August 1998, and "JavaMail API documentation", JavaMail 1.3.3, Jun. 27, 2003, available at <http http://java.sun.com/products/javamail/javamail-1_3_1.html>, Sun Microsystems Inc., the entire contents of which are incorporated by reference as if set forth in full herein.

JavaMail API module 404 defines, for example, the Java classes MimeMessage, MimeMultipart, MimeBodyPart, and Transport. The MimeMessage and MimeBodyPart classes implement widely used Internet mail protocols and conform to specifications RFC 822, "Standard for ARPA Internet Text Messages", dated August 1982 (which obsoletes RFC 733), and RFC 2045, "Multipurpose Internet Mail Extensions (MIME) Part One: Format of Internet Message Bodies", dated November 1996 (which obsoletes RFC 1521, 1522, and 1590), the entire contents of which are incorporated by reference as if set forth in full herein.

The MimeMessage class defines a set of attributes and a content for a mail message. Attributes of the MimeMessage class specify addressing information and define the structure of the content, including the content type. The content of a MimeMessage object for a typical multipart mime message is represented as a MimeMultipart object that includes one or more MimeBodyPart objects. The content of each MimeBodyPart is represented as a DataHandler object that wraps around the actual data.

The MimeMessage class adds From, To, Subject, Reply-To, and other attributes necessary for message routing via a message transport system. The content of a message is a collection of bytes, or a reference to a collection of bytes, encapsulated within a MimeMessage object.

The MimeMultipart class is an implementation of the abstract Multipart class that uses MIME conventions for the multipart data. MimiMultipart objects contain one or more MimeBodypart objects.

JavaMail API module 404 has no knowledge of the data type or format of the message content. A MimeMessage object interacts with its content through an intermediate layer, JavaBeans Activation Framework (JAF) module 405. This separation allows a MimeMessage object to handle any arbitrary content and to transmit it using any appropriate transmission protocol by using calls to the same API methods.

The JavaBeans Activation Framework is described in Calder, et. al, "JavaBeans™ Activation Framework Specification", Version 1.0a, Sun Microsystems Inc., May 27, 1999, and JavaBeans Activation Framework 1.0.2 API documentation, 2002, available at <http http://http://java.sun.com/products/archive/javabeans/jaf102.html>, Sun Microsystems Inc., the entire contents of which are incorporated by reference as if set forth in full herein.

JAF module 405 defines the DataHandler class, FileDataSource class, and URLDataSource class.

JavaMail provides convenient methods to interact with JAF. JavaMail also provides convenient methods to interact with customized Java libraries. For example, MimeMessage's setDataHandler( )method specifies a customized DataHandler class to be used for accessing content of a MimeMessage.

Support for secure messaging (e.g., support for S/MIME) is not ordinarily provided by JavaMail. Accordingly, in the example embodiment, S/MIME library module 336 is provided, which is a Java library that builds security on top of MIME to provide secure electronic messaging of Internet mail in the form of message authentication and data security.

S/MIME library module 336 includes S/MIME JavaMail/JAF callback handler module 401, S/MIME utility module 402, and S/MIME message module 403. S/MIME utility module 402 includes streaming module 406 and signing module 407.

S/MIME JavaMail/JAF callback handler module 401 includes an SMIMEDataContentHandler abstract base class, and a MultipartSigned class. The MultipartSigned class receives a JavaMail/JAF callback from mail module 337, and processes a MIMEMultipart object which includes a MimeBodyPart object for attachment data, and a MimeBodyPart object for PKCS7 signature data.

Streaming module 406 includes an SMIMESignedAttachment class and signing module 407 includes a SignerPKCS7SignatureHandler class. The SMIMESignedAttachment class receives a callback from S/MIME JavaMail/JAF callback handler module 401 for streaming and digesting attachment data. The SignerPKCS7SignatureHandler class receives a callback from S/MIME JavaMail/JAF callback handler module 401 for generating the PKCS7 signature data.

Table 1 defines the SMIMESignedAttachment class.

TABLE 1

SMIMESignedAttachmentHandler Definition

Class SMIMESignedAttachment
    CLASS DESCRIPTION:
    Package namespace:
    com.canon.meap.smime.util.SMIMESignedAttachment
    Usage:
    SMIMESignedAttachment receives a callback from S/MIME
    JavaMail/JAF callback handler module for sending attachment
    data to recipients, and meanwhile also calculates a message digest
    value. When all attachment data is sent, the final message
    digest value is returned back to the S/MIME javamail/JAF
    callback handler module.
    CLASS SIGNATURE:
public class SMIMESignedAttachment implements
SMIMEStreamDigestHandler
/ * An interface to handle SMIME streaming. */
public interface SMIMEStreamDigestHandler
{
 public byte[ ]
 write(OutputStream out,javax.mail.internet.MimeMultipart objOrg)
throws SMIMEException,IOException,MessagingException;
}
Method Detail
Write
    Function signature:
public byte[ ] write(OutputStream
smtpOut,javax.mail.internet.MimeMultipart objOrg)
throws SMIMEException
    Function description:
Write attachment files with SMTP stream and return message digest
value. This is called by function
com.canon.meap.smime.activation.handler.MultipartSigned.writeTo( )
from the S/MIME JavaMail/JAF callback Handler module.

Table 2 defines the SignerPKCSSignatureHandler class.

TABLE 2

SignerPKCSSignatureHandler Definition

Class SignerPKCSSignatureHandler
    CLASS DESCRIPTION:
    Package namespace:
    com.canon.meap.smime.util.SignerPKCSSignatureHandler
    When the S/MIME JavaMail/JAF callback handler module receives the final message
    digest value from the SMIMESignedAttachment class, the S/MIME JavaMail/JAF
    callback handler module calls the SignerPKCSSignatureHandler class, and also passes
    the final message digest value to the SignerPKCSSignatureHandler class.
    The SignerPKCSSignatureHandler generates the PKCS7 signature data by using a
    signer to sign the final message digest value with a signer's private key. In the
    example embodiment, the signer is the SignerPKCSSignatureHandler class, and
    SignerPKCSSignatureHandler signs the final message digest value itself using a
    signer's private key. However, in other embodiments, SignerPKCSSignatureHandler
    calls a signer, such as for example, a smart card, or the S/MIME application module, to
    sign the final message digest value using a signer's private key. After the PKCS7
    digital signature is generated, SignerPKCSSignatureHandler sends the generated
    PKCS7 signature data to recipients.
    CLASS SIGNATURE:
private class SignerPKCSSignatureHandler implements SMIMEStreamPKCSHandler
/ * An interface to handle SMIME streaming. */
public interface SMIMEStreamPKCSHandler
{ public void write(OutputStream out,byte[ ] hash) throws SMIMEException; }
Method Detail
Write
    Function signature:
public void write(OutputStream out, byte[ ] hash) throws SMIMEException
    Function description:

TABLE 2-continued

SignerPKCSSignatureHandler Definition

Writes the complete contents to the specified output stream.
This is callback from
com.canon.meap.smime.activation.handlers.SMIMEDataContentHandler.writeTo( ).
Also the output stream (i.e., OutputStream out) to which the data is written is a
BASE64EncoderStream instance from JavaMail.

Methods in S/MIME library module 336 are called by S/MIME application module 335 and interact with mail module 337, and S/MIME library module 336 calls methods in mail module 337. S/MIME library module 336 validates a certificate's validity with CA/OCSP server 104, and streams attachment data from a data source (e.g., local storage locations on hard disk 345, addresses of real-time data input devices, such as, for example, a scanner connected to scanner interface 324, or remote locations, such as, for example, locations on data server 105). S/MIME application module 335 can control the streaming of attachment data from the data source to S/MIME library module 336. S/MIME library module 336 streams attachment data and a digital signature to mail server 106.

Figure 5:
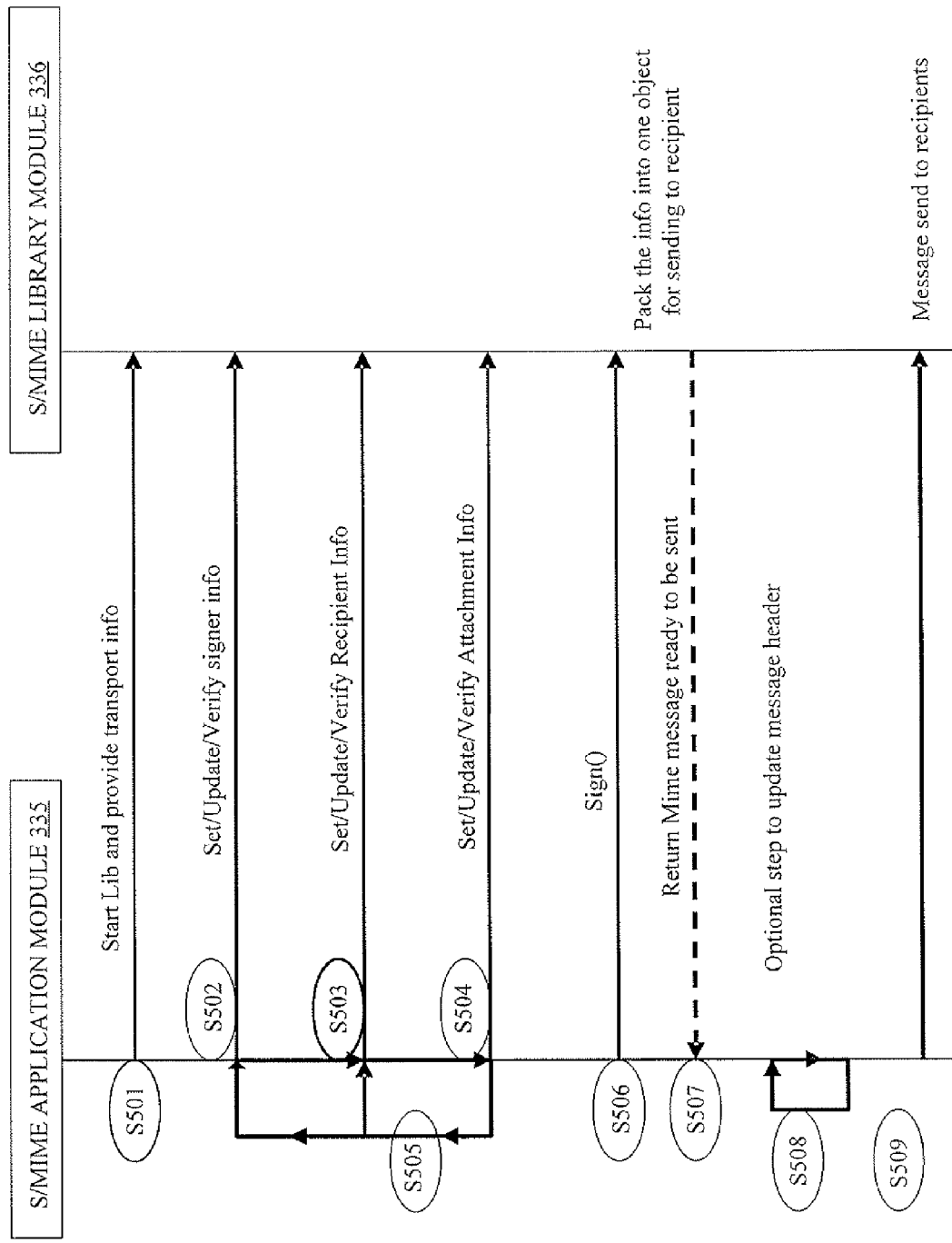
FIG. 5 is sequence diagram for explaining a process for sending an e-mail message according to an example embodiment.

FIG. 5 is a sequence diagram for explaining a process for sending an e-mail message using sending device 101. S/MIME application module 335 calls a method in S/MIME message module 403 (which is part of the S/MIME library module 336) to create a signed S/MIME e-mail message. At step S501, S/MIME application module 335 calls an SMIMEMail( )method in S/MIME message module 403 and passes transport information (which includes smtpHost, from, subject, and content information) to create a an SMIMEMail object.

At step S502, S/MIME application module 335 uses the SMIMEMail object to set signer information. In particular, S/MIME application module 335 calls a method in S/MIME message module 403 to create an S/MIME signer object to be used to generate the PKCS7 signature data. After creating the S/MIME signer object, S/MIME application module 335 calls a setSigner( )method of the SMIMEMail object to set the signer information of the SMIMEMail object to specify the created S/MIME signer object.

In the example embodiment, application module 335 can create an S/MIME signer object by specifying a certificate store that contains the signer's private key used to generate the PKCS7 signature data, by specifying a signer's private key and a signer certificate list, by specifying a reference to an interface for a smart card or an application module that generates the PKCS7 signature data using the signer's private key, or by specifying a reference to an interface for a smart card or an application module that generates the PKCS7 signature data using the signer's private key along with a signer certificate list. Table 3 defines the setSigner( )method of the SMIMEMail object that is used to set the signer information of the SMIMEMail object.

TABLE 3 setSigner( )method definition 1. public void setSigner(String pfxfileName, String password) throws SMIMEException
// Specifies a certificate store that contains the signer's private key
used to generate the PKCS7 signature data
2. public void setSigner(String storePath, String password,
String aliasName, String aliasPwd, String type ) throws SMIMEException

TABLE 3-continued setSigner( )method definition

// Specifies a certificate store that contains the signer's private key
used to generate the PKCS7 signature data
3. public void setSigner(PrivateKey key, X509Certificate[ ] certs) throws
SMIMEException
// Specifies a signer's private key and a signer certificate list
4. public void setSigner(PKIInterface scHandler) throws SMIMEException
//Specifies a reference to an interface (i.e., PKIInterface) for a smart card
or an application module that generates the PKCS7 signature
data using the signer's private key
5. public void setSigner(PKIInterface scHandler, X509Certificate[ ] certs)
throws SMIMEException
//Specifies a reference to an interface (i.e., PKIInterface) for a smart card
or an application module that generates the PKCS7 signature
data using the signer's private key along with a signer certificate list Table 4 defines the PKIInterface interface shown in Table 3.

TABLE 4

PKIInterface definition

```
/**
 * Description: This class defines a generic interface for the
 * library to perform PKI operations via the implementation
 * object passed by the application.
 *
 * Motivation: For supporting a smart card where the data will be signed
by the smart card instead.
 *Also, if the application does not want to pass the private key, then it
can implement this method in the application module (i.e. 335).
 */
public interface PKIInterface
{
    /**
     * Decrypts a blob of data.
     * @param data the data to be decrypted.
     * @return the decrypted data.
     * @throws Exception if error occurs during decryption.
     */
    public byte[ ] decrypt(byte[ ] data) throws Exception;
    /**
     * Signs a blob of data.
     * @param data the data to be signed.
     * @return the signed data.
     * @throws Exception if error occurs during signing.
     */
    public byte[ ] sign(byte[ ] data) throws Exception;
    /**
     * Returns the X.509 certificate data.
     * @return the certificate data.
     * @throws Exception if error occurs during retrieval.
     */
    public byte[ ] getCertificateData( ) throws CertificateException;
}
```

At step S503, S/MIME application module 335 calls a setRecipients( )method of the SMIMEMail object to set the recipient information of the SMIMEMail object to specify a list of all recipients.

At step S504, S/MIME application module 335 calls a setAttachment( )method of the SMIMEMail object to set the attachment information of the SMIMEMail object to specify one or more locations of attachment data.

At step S505, S/MIME application module 335 updates and verifies the signer information, recipient information, and/or attachment information, if any of the signer information, recipient information, and/or attachment information is invalid.

S/MIME application module 335 can perform the updating and verification described with respect to step S505 after any of steps S502, S503, and S504. S/MIME application module 335 can perform steps S502, S503 and S504 in any order.

At step S506, S/MIME application module 335 calls a sign( )method of the SMIMEMail object to have S/MIME message module 403 pack the signer information, recipient information, and attachment information (specified by the SMIMEMail object) into a MimeMessage object.

In particular, S/MIME message module 403 validates the signer certificate specified by the signer information of the SMIMEMail object by validating a certificate list (i.e., certificate chain) for the signer certificate. If the signer information does not specify a signer certificate list for the signer certificate, S/MIME message module 403 validates the signer certificate by building a certificate chain for the signer certificate, and validating the certificate chain.

If a configuration setting specifies that Certificate Revocation List (CRL) chain validation is to be performed, S/MIME message module 403 builds a CRL chain for the signer certificate, and validates the CRL chain. If a configuration setting specifies that Online Certificate Status Protocol (OCSP) validation is to be performed, S/MIME message module 403 validates the signer certificate using OCSP. If a configuration setting specifies that both CRL chain validation and OCSP validation are to be performed, S/MIME message module 403 first performs OCSP validation, and then performs CRL chain validation if OCSP validation cannot be performed, or if problems are encountered.

In another embodiment, a CRL chain is sent to recipients which perform CRL validation of the signer certificate.

If the signer certificate is valid, S/MIME message module 403 creates a MimeBodyPart object for attachment data, and a MimeBodyPart object for PKCS7 signature data, and sets the appropriate message header attributes. The attachment MimeBodyPart content is wrapped in a SMIMESignedAttachment object class and contains the location of attachment files included in the attachment information, and digest algorithm information specified by the signer information. These file locations can include local storage locations on hard disk 345, addresses of real-time data input devices, such as, for example, a scanner connected to scanner interface 324, or remote locations, such as, for example, locations on data server 105. The attachment files can have any type of format, such as, for example, .pdf, .tiff, .img, .doc, .zip format, or any other type of data format. The PKCS7 signature MimeBodyPart content is wrapped in a SignerPKCSSignatureHandler object class and contains the signer information. S/MIME message module 403 adds the attachment MimeBodyPart and the PKCS7 signature MimeBodyPart to a MimeMultipart object, and includes the MimeMultipart object in the content of the MimeMes sage object.

S/MIME message module 403 calls a static JAF method to register S/MIME JavaMail/JAF callback handler module 401 as the callback class for the MimeMessage object.

At step S507, S/MIME message module 403 returns the packaged MimeMessage object to S/MIME application module 335. At step S508, after receiving the packaged MimeMessage, S/MIME application module 335 updates message headers of the MimeMessage object if it is determined that the message headers of the MimeMessage object are to be updated.

At step S509, S/MIME application module 335 calls a sendMessage( )method of the SMIMEMail object to send the e-mail message represented by the MimeMesasge object received at step S507.

Table 5 illustrates code for an example sendMessage( )

TABLE 5 code for an example sendMessage( )

```
/Sends S/MIME message to all recipient addresses specified in the
message via SMTP host.
* @param msg The message to send.
* @throws SMIMEException If the message cannot be sent.
* The exception includes those addresses to which the message could
* not be sent as well as the valid addresses to which the message was
* sent and valid addresses to which the message was not sent.
*/
public void sendMessage(final MimeMessage msg) throws
SMIMEException
{
    Transport transport = null;
    ConnectionHandler connHandler = null;
    TransportHandler transportHandler = null;
    try {
        transport = m_session.getTransport("smtp");
        connHandler = new ConnectionHandler( );
        transportHandler = new TransportHandler( );
        transport.addConnectionListener(connHandler);
        transport.addTransportListener(transportHandler);
        transport.connect( );
        transport.sendMessage(msg,msg.getAllRecipients( ));
    }
    catch (Exception ex) {
        throw new SMIMEMessagingException;
    }
}
```

Before the sendMessage( )method is called, the attachment MimeBodyPart of the MimeMessage object does not contain the actual attachment data, but rather contains the location of attachment files. As will be described below with respect to FIG. 6, as the e-mail message is being sent, attachment data is streamed from the file locations. Because S/MIME message module 403 performs certificate validation before the attachment data is streamed from the file locations, certificate validation errors can be detected and handled before the attachment data streaming operation is performed, without interrupting the streaming operation.

In other embodiments, certificate validation is not performed before attachment data is streamed. In further embodiments, certificate validation is not performed.

Similarly, before the sendMessage( )method is called, the PKCS7 signature MimeBodyPart of the MimeMessage object does not contain the actual PKCS7 signature data, but rather contains the signer information which specifies the signer used to generate the PKCS7 signature data.

As will be described below with respect to FIG. 6, attachment data is digested as it is being streamed from the file locations and sent to mail server 106. In particular, the SMIMESignedAttachment object class receives a callback from S/MIME JavaMail/JAF callback handler module 401 and reads the attachment data and digests the streamed attachment data on-the-fly, as it is being sent to mail server 106. After all of the attachment data is sent to mail server 106, the SMIMESignedAttachment object class passes the generated message digest value to S/MIME JavaMail/JAF callback handler module 401. S/MIME JavaMail/JAF callback handler module 401 passes the received message digest value to the SignerPKCSSignatureHandler object class. After receiving the digest value, the SignerPKCSSignatureHandler object class generates the PKCS7 signature data using the signer specified by the signer information. The PKCS7 signature data is sent to mail server 106.

By virtue of the fact that the SMIMESignedAttachment object class digests the attachment data on-the-fly as it is being streamed from the file locations, and the generated message digest value is passed to the SignerPKCSSignatureHandler object class, the SignerPKCSSignatureHandler object class does not have to read the attachment data from the file locations. Thus, S/MIME library module 336 reads the attachment data from the file locations once, as the attachment data is being sent to the mail server, and S/MIME library module 336 does not have to read the attachment data a second time to generate the digest value used to create the PKCS7 signature data.

Table 6 illustrates code for an example S/MIME application module.

TABLE 6

Code for an example S/MIME application module

```
import com.canon.meap.smime.SMIMEMail;
import com.canon.meap.smime.SMIMEAttachment;
import com.canon.meap.smime.SMIMERecipient;
import com.canon.meap.smime.SMIMESigner;
import com.canon.meap.smime.SMIMEException;
import javax.mail.*;
import javax.mail.internet.*;
    String smtpHost = "146.184.21.207";
    String subject = "testing SMIME signed...";
    String content= "hello from CDA RML!!";
    String from = "rmluser1@rml.cda.com";
try {
    SMIMEMail sm = new SMIMEMail(smtpHost ,from,
    subject,content);
    sm.setSigner(getSigner(SMIMESigner.DIGEST_SHA1,
    , SMIMESigner. SIGNER_TYPE_SMART_CARD));
    sm.setRecipients(getRecipients(false));
    sm.setAttachment(getAttachements( ));
    MimeMessage msg = sm.sign( ) // clear-signed message
    sm.sendMessage(msg);
}
        catch (SMIMEException ex) {
            System.err.println("ex=" + ex.getMessage( ));
}
```

The S/MIME standard defines two types of signing methods. One method is a method for generating a clear-signed message, and the other is an method for generating an opaque-signed message. In the example embodiment, the sign( )method of the SMIMEMail object is a signing method for a clear-signed message. A clear-signed message can be read by a message recipient even if the digital signature is invalid. In contrast, an opaque-signed message cannot be read by a recipient if the message's digital signature is invalid.

Table 7 defines the setSigner( )method shown in Table 6.

TABLE 7 setSigner( )method definition

```
import com.canon.meap.smime.SMIMESigner;
import com.canon.meap.smime.SMIMEException;
import com.canon.meap.smime.pki.PKIInterface;
public SMIMESigner getSigner(String digestOID, String signMethod)
throws SMIMEException
{
    SMIMESigner ss = new SMIMESigner(digestOID);
    //the application selects one of four signer methods provided to set the
    //signer based on the use case.
```

TABLE 7-continued setSigner( )method definition

```
    if (signMethod == SMIMESigner.
    SIGNER_TYPE_SMART_CARD)
    {
    // The PKIInterfaceImpl class is implemented by the application
    // It contains methods to use a smart card for
    // validating pin, signing, getting certificate, etc.
        PKIInterface scHandler = new PKIInterfaceImpl(...);
        ss.setSigner(scHandler);
    //NOTE: the application can optionally call
    // ss.setSigner(scHandler,x509Certs) to pass a signer's list
    // of certificates (not including the signer certificate itself) for
    // validating and building a certificate chain.
    // if no certificate list is passed, the library retrieves certificates via
    // either TrustedCerts if the exist or via AIA URL.
    }
        else if (signMethod == SMIMESigner.
        SIGNER_TYPE_PFX_STORE)
{
    //for certificates store in a PFX/PKCS#12 cert store.
        ss.setSigner(pfxFileName,   //PFX/PKCS#12 key store name
                    storePwd); //store password
    }
    else if (signMethod == SMIMESigner. SIGNER_TYPE_JKS_STORE)
{
    //for certificates store in a JKS/PKCS#12 cert store.
        ss.setSigner(keystore,   //JKS/PKCS#12 key store name
                storePwd,   //store password
                aliasName,   //alias for signer's private key
                aliasPwd,   //password to protect the key
                type);      //"JKS" or "p12"
    }
    else if (signMethod == SMIMESigner.
    SIGNER_TYPE_X509_CERT_LIST) {
    //for JKS key store use case, the caller needs to implement code
    //to retrieve the private key from keystore.
    //it can be used in other use cases as long as the caller is
    //able to retrieve the Private key and the list of signer
    //certificates from a specific location or persistent file.
        ss.setSigner(pk,   //Private key of signer
                certs);   //certificate list
    }
    return ss;
}
```

Figure 6:
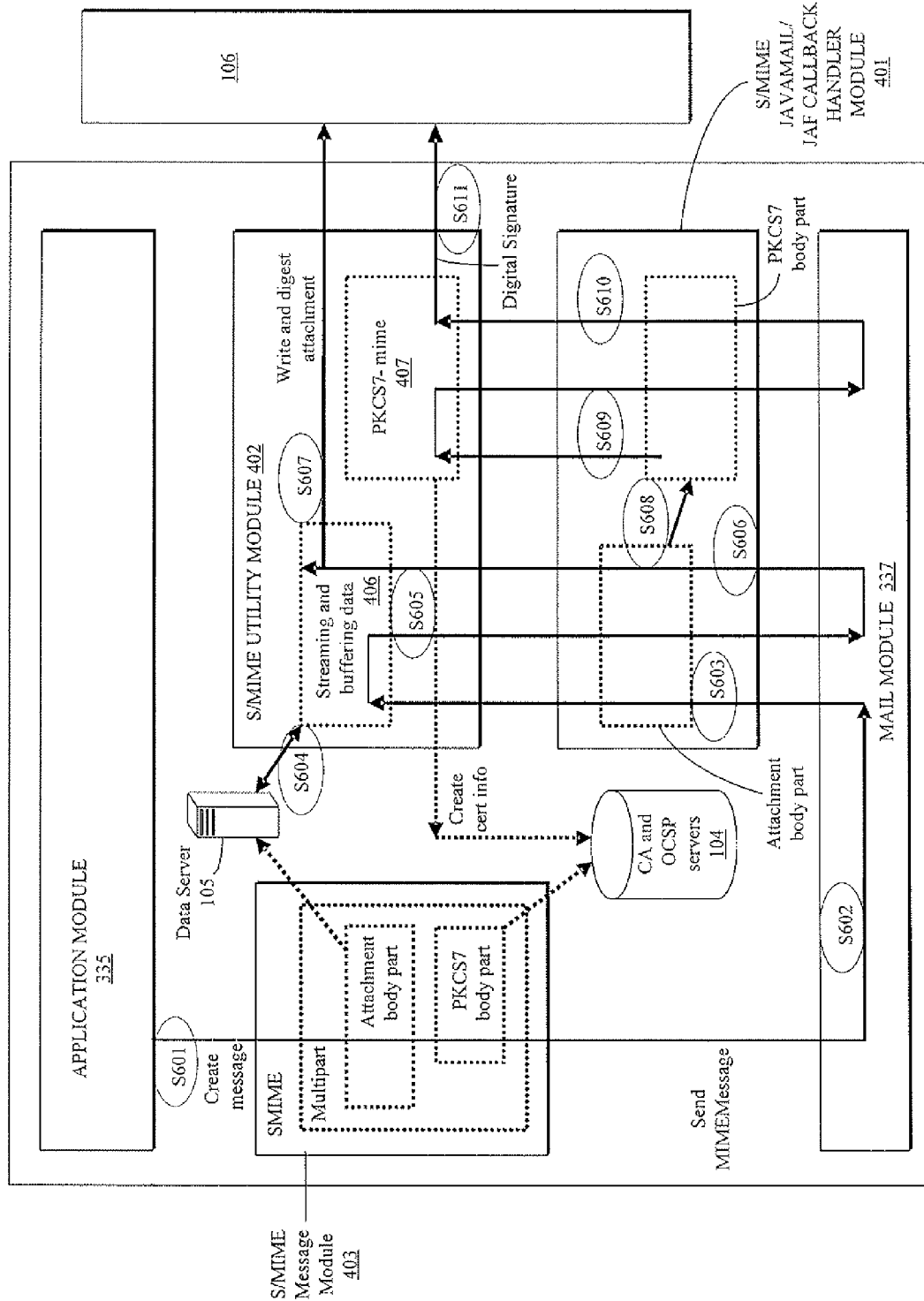
FIG. 6 is a view for explaining a process for sending an e-mail message according to an example embodiment.

FIG. 6 is a view for explaining a process for sending an e-mail message using sending device 101. In the example embodiment illustrated in FIG. 6, the data source is a location on data server 105. However, in other embodiments, the data source can be local storage locations on hard disk 345, addresses of real-time data input devices, such as, for example, or scanner connected to scanner interface 324, or remote locations such as, for example, locations on data server 105.

At step S601, S/MIME application module 335 calls the sign( )method of the SMIMEMail object to create the MimeMessage object, as described above with respect to FIG. 5. The dotted line connecting S/MIME message module 403 to data server 105 indicates that before the MimeMessage object is sent, the attachment MimeBodyPart of the MimeMessage object does not contain the actual attachment data, but rather contains the location of attachment files. The dotted line connecting S/MIME message module 403 to CA/OCSP server 104 indicates that before the MimeMessage object is sent, the PKCS7 signature MimeBodyPart of the MimeMessage object does not contain the actual PKCS7 signature data, but rather contains the signer information which specifies the signer used to generate the PKCS7 signature data.

At step S602, after receiving the MimeMessage object, S/MIME application module 335 calls the sendMessage( )method of the SMIMEMail object to send the e-mail message represented by the MimeMesasge object, as described above with respect to FIG. 5. In response to S/MIME application module 335 calling the sendMessage( ) method of the SMIMEMail object, S/MIME message module 403 calls a transport.sendMessage( )method of JavaMail API module 404 (which is included in mail module 337).

In response to receiving the call to the transport.sendMessage( )method, JavaMail API module 404 creates an output data stream for streaming the e-mail message represented by the MimeMessage object from sending device 101 to a mail server specified by the recipient information (e.g., mail server 106), and connected to sending device 101 via network 107. After creating the output data stream, JavaMail API module 404 calls S/MIME JavaMail callback handler module 401 (which is registered as the callback class for the MimeMessage object, as described above for step S506 of FIG. 5), and passes a pointer to the output data stream to S/MIME JavaMail/JAF callback handler module 401.

In response to receiving the callback from JavaMail API module 404, S/MIME JavaMail/JAF callback handler module 401 sends the header attributes of the MimeMesage object to the mail server via the output data stream, and then sends the header attributes of the attachment MimeBodyPart object to the mail server via the output data stream. After sending the attachment MimeBodyPart object header attributes, at step S603, S/MIME JavaMail/JAF callback handler module 401 sends the attachment MimeBodyPart object content by calling streaming module 406 (which includes the SMIMESignedAttachment object class).

At step S604, after receiving the call from S/MIME JavaMail/JAF callback handler module 401, streaming module 406 gets a pointer to an input data stream for the attachment file locations contained in the attachment MimeBodyPart object of the MimeMessage object. Streaming module 406 sends the input data stream pointer to S/MIME JavaMail/JAF callback handler module 401.

At step S605, after receiving the input data stream pointer, S/MIME JavaMail/JAF callback handler module 401 calls a streaming method of JavaMail API module 404 to read the attachment data via the input data stream, and pass the streamed attachment data to streaming module 406, via S/MIME JavaMail/JAF callback handler module 401. In particular, JavaMail API module 404 calls a MultipartSigned class in S/MIME JavaMail/JAF callback handler module 401, and then the MultipartSigned class calls the SMIMESignedAttachment object class in streaming module 406 via an interface mechanism.

In response to receiving the call from S/MIME JavaMail/JAF callback handler module 401, JavaMail API module 404 reads the attachment data from the input data stream, and calls streaming module 406 (step S606). In response, streaming module 406 receives data from the specified data source location to stream the attachment data to the mail server via the output data stream created in step S602. While streaming the data, streaming module 406 also calculates the message digest value.

At step S607, streaming module 406 receives streamed attachment data from the specified data source location, and buffers the received attachment data in a buffer memory (e.g., RAM 316). Because the attachment data is streamed and portions of attachment data are buffered and processed as they are received, the attachment data does not have to be read into memory all at once. Rather, only a portion of the attachment data is buffered at any given time. Since only a portion of the attachment data is buffered at any given time, the capacity of the memory buffer can be smaller than a size of the attachment data specified by the attachment information. In this manner, large attachment files can be sent without the need for a large buffer memory.

After a predetermined number of bytes of attachment data is buffered in the buffer memory, the buffered portion of the attachment data is digested (using the digest algorithm information specified by the signer information) to generate a message digest value at the same time that the buffered portion of the attachment data is sent to the mail server via the output data stream. The digest value is updated as additional portions of the streamed attachment data are received and digested.

By performing digesting after a predetermined number of bytes of attachment data has been buffered, the number of digest operations that are performed may be less, as compared to performing a digest operation each time new bytes are received.

In other example embodiments, streaming module 406 does not buffer streamed attachment data received from the specified data source location(s), but rather performs a digest operation each time new bytes are received.

After streaming module 406 sends all attachment data specified by the attachment information to the mail server, streaming module 406 passes the generated digest value to S/MIME JavaMail/JAF callback handler module 401 (step S608). In the case that the reading of the attachment data from the input data stream is stopped abruptly, the digest value can still be used to generate a valid PKCS7 signature data for the attachment data that has already been read.

At step S609, S/MIME JavaMail/JAF callback handler module 401 calls signing module 407 to generate the digest value using the signer specified by the signer information, thereby creating the PKCS7 signature data. After generating the PKCS7 signature data, signing module 407 calls S/MIME JavaMail/JAF callback handler module 401, which calls an encoding method of mail module 337 to apply Base64 transfer encoding to the PKCS7 signature data. Mail module 337 creates a Base64 output data stream (e.g., a Base64EncoderStream that wraps an SMTPOutputStream via SMIMEStreamPKCSHandler class) for streaming the clear-text PKCS7 signature data of the e-mail message represented by the MimeMessage object. At step S610, after creating the Base64 output data stream, mail module 337 calls S/MIME JavaMail/JAF callback handler module 401 (which is registered as the callback class for the MimeMessage object, as described above for step S506 of FIG. 5), and passes a pointer to the Base64 output data stream to S/MIME JavaMail/JAF callback handler module 401.

S/MIME JavaMail/JAF callback handler module 401 passes the pointer to the Base64 output data stream to signing module 407, and at step S611, signing module 407 buffers the Base-64-transfer-encoded PKCS7 signature data in the buffer memory, and writes the buffered PKCS7 signature data to the mail server via the Base64 output data stream.

Figure 7:
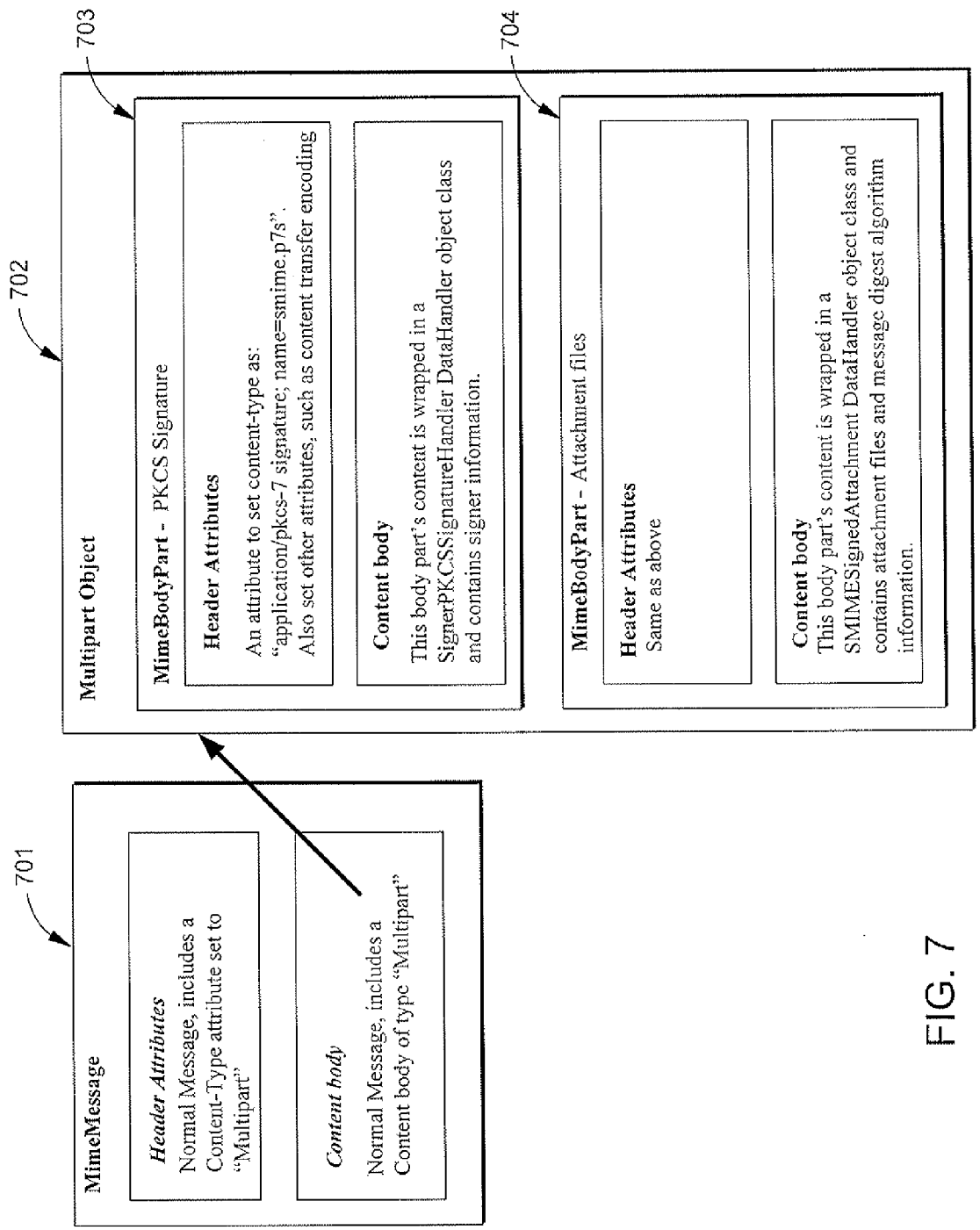
FIG. 7 illustrates the structure and content of a signed e-mail message according to an example embodiment.

FIG. 7 illustrates the structure and content of a multipart message object for a signed e-mail message according to the example embodiment. As shown in FIG. 7, MimeMessage 701 is a message object where the Content-Type is set to "multipart", and the Content Body carries a reference to MimeMultipart object 702. MimeMultipart object 702 is a container of two MimeBodyPart objects, where PKCS Signature MimeBodyPart 703 contains signer information, and Attachment files MimeBodyPart 704 contains attachment information.

Figure 8A:
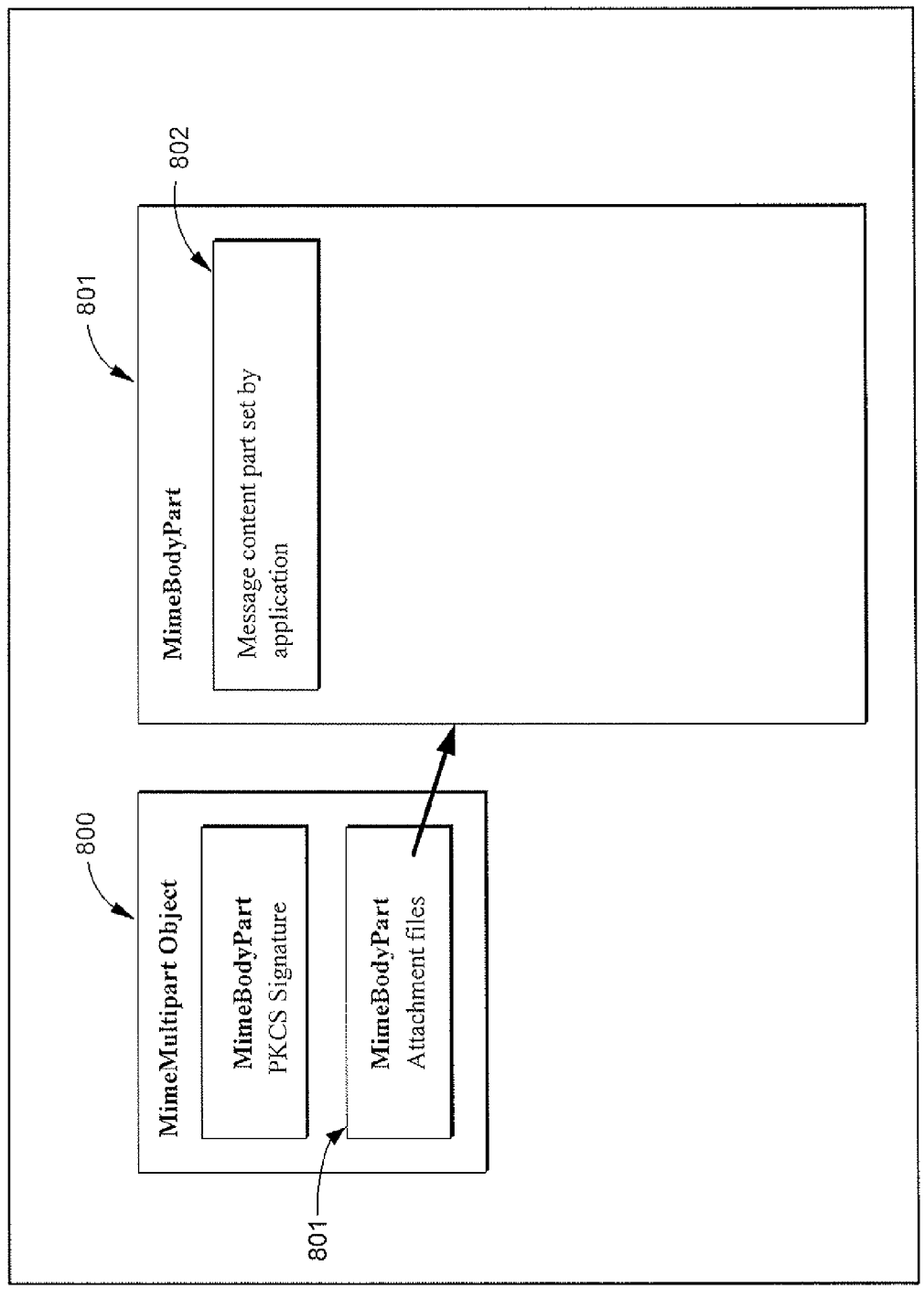
FIGS. 8A and 8B illustrate the structure and content of an e-mail message according to an example embodiment.
Figure 8B:
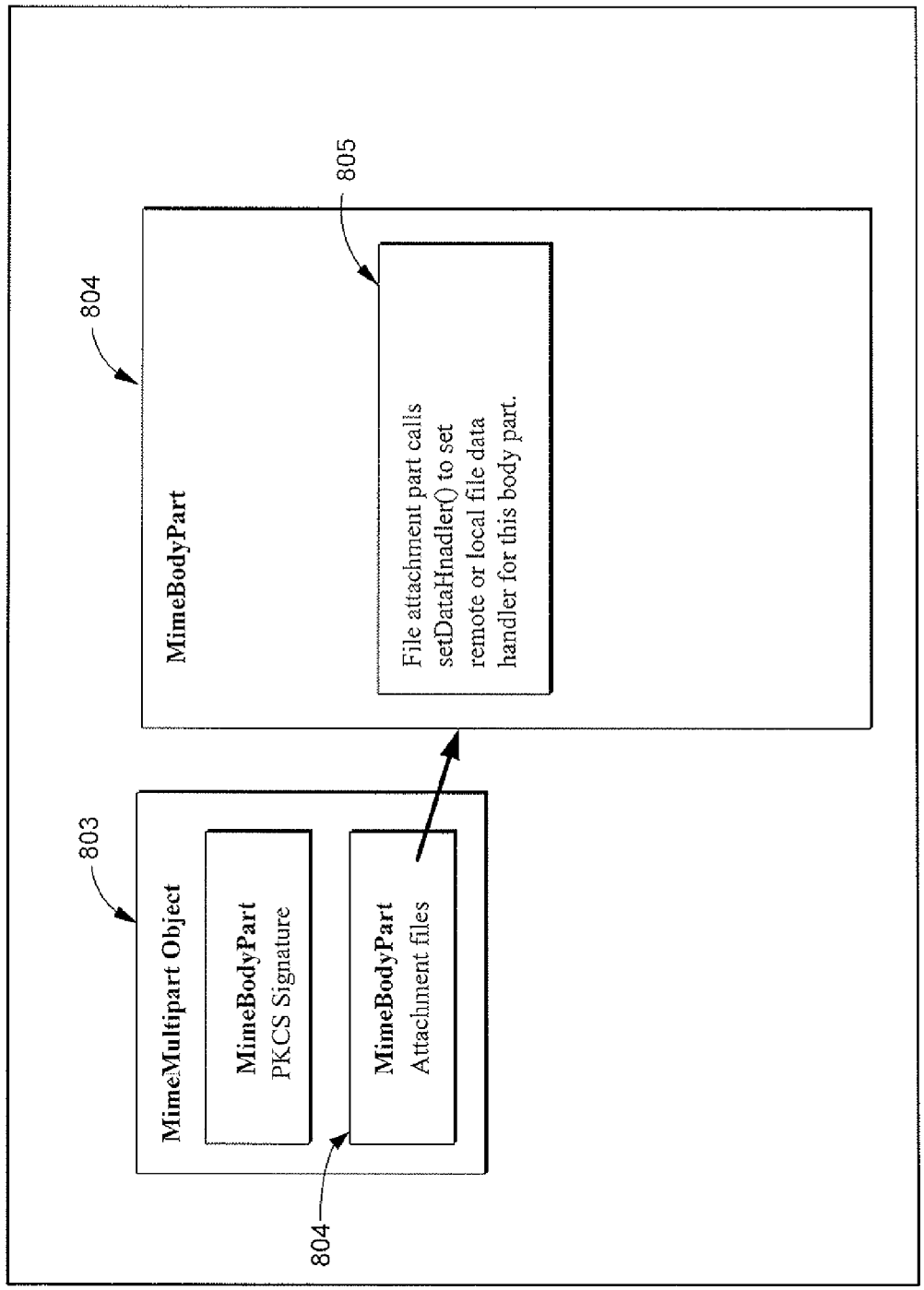

FIGS. 8A and 8B illustrate the structure and content of example e-mail message objects (packed by S/MIME message module 403, in step S506) in which the MimeMultipart object either has one attachment with no content, or has no attachment with content. As shown in FIG. 8A, MimeMultipart object 800 is a MimeMultipart object similar to MimeMultipart object 702 of FIG. 7. As shown in FIG. 8A, MimeBodyPart object 801 includes message content 802 (no attachment with content). Message content 802 is set by S/MIME application module 335. As shown in FIG. 8B, MimeMultipart object 803 is a MimeMultipart object similar to MimeMultipart object 702 of FIG. 7. As shown in FIG. 8B, MimeBodyPart object 804 includes file attachment 805 (one attachment with no content). File attachment 805 contains a pointer to a file location. The file location can be either a remote location, identified by a URL, or a local location, identified by a file path.

Figure 9A:
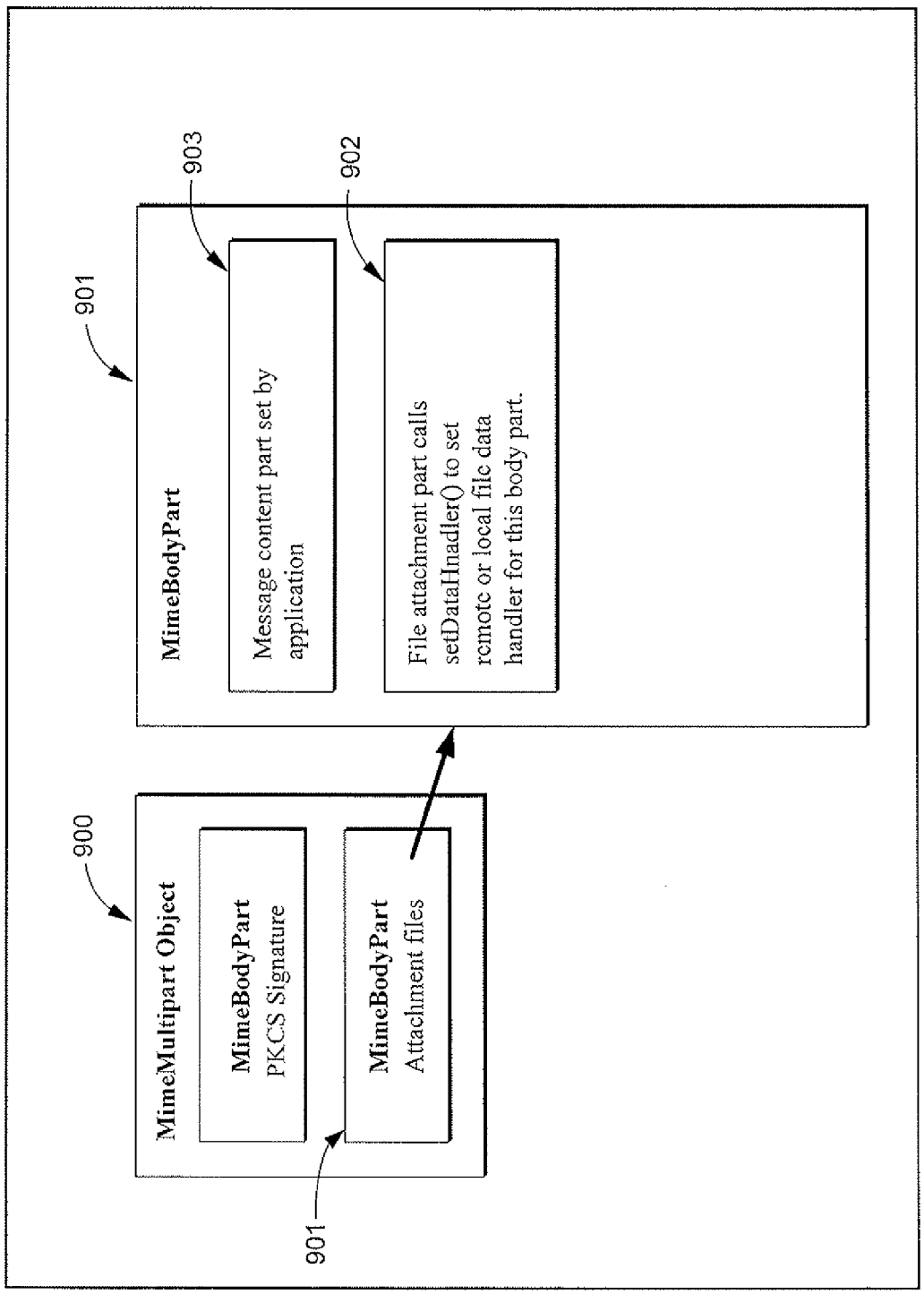
FIGS. 9A and 9B illustrate the structure and content of an e-mail message according to an example embodiment.
Figure 9B:
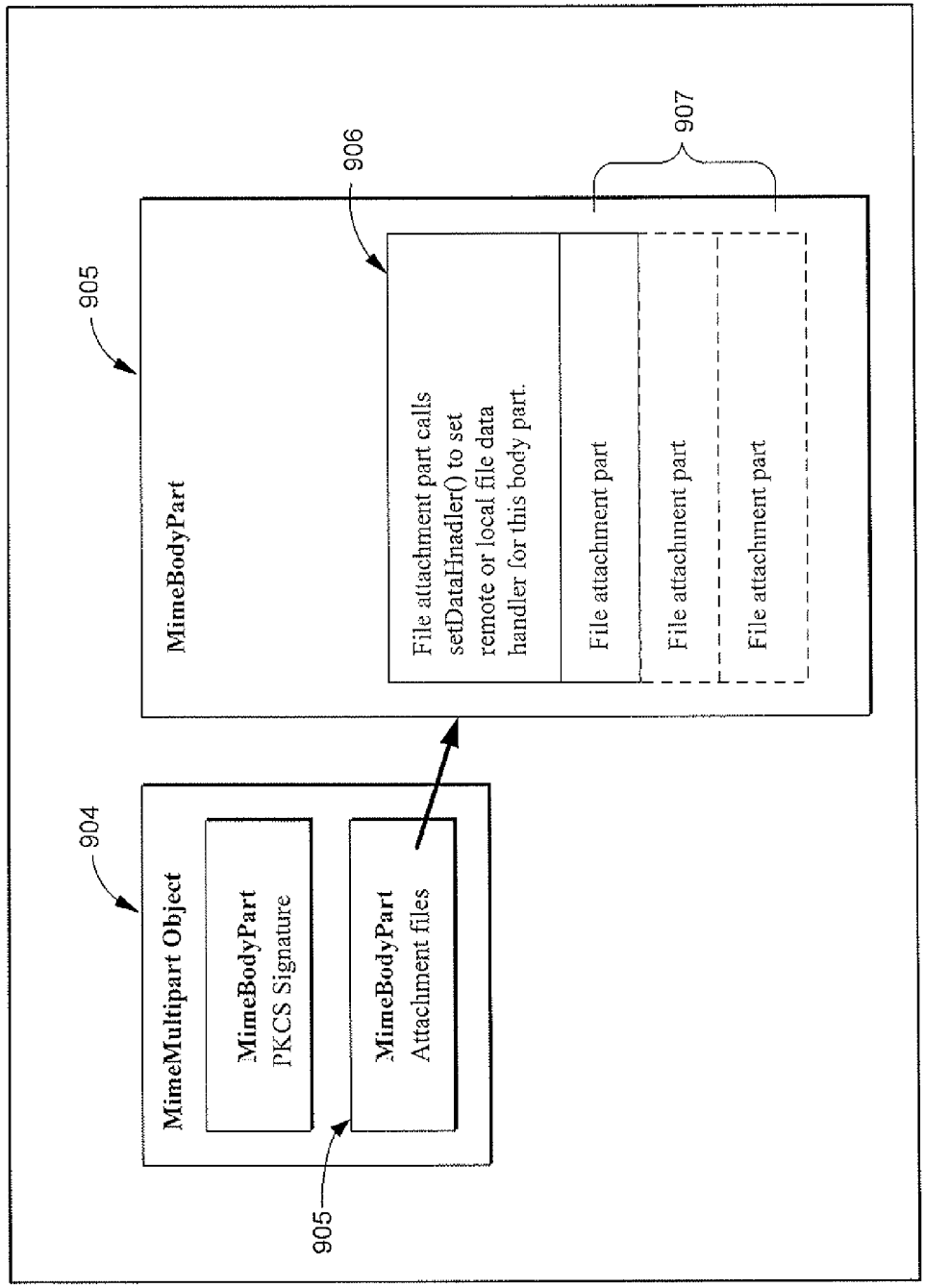

FIGS. 9A and 9B illustrate the structure and content of example e-mail message objects (packed by S/MIME message module 403, in step S506) in which the MimeMultipart object either has multiple attachments without content, or one attachment with content. In other embodiments, the MimeMultipart object can have content and multiple attachments. In FIG. 9A, MimeMultipart object 900 is a MimeMultipart object similar to MimeMultipart object 702 of FIG. 7. As shown in FIG. 9A, MimeBodyPart object 901 includes file attachment 902, and message content 903 (one attachment with content). Message content 903 is set by S/MIME application module 335. File attachment 902 contains a pointer to a file location. The file location can be either a remote location, identified by a URL, or a local location, identified by a file path. In FIG. 9B, MimeMultipart object 904 is a MimeMultipart object similar to MimeMultipart object 702 of FIG. 7. As shown in FIG. 9B, MimeBodyPart object 905 includes file attachment 906 and one or more additional file attachments 907 (multiple attachments without content). File attachments 906 and 907 each contain a pointer to a file location. The file location can be either a remote location, identified by a URL, or a local location, identified by a file path.

Figure 10:
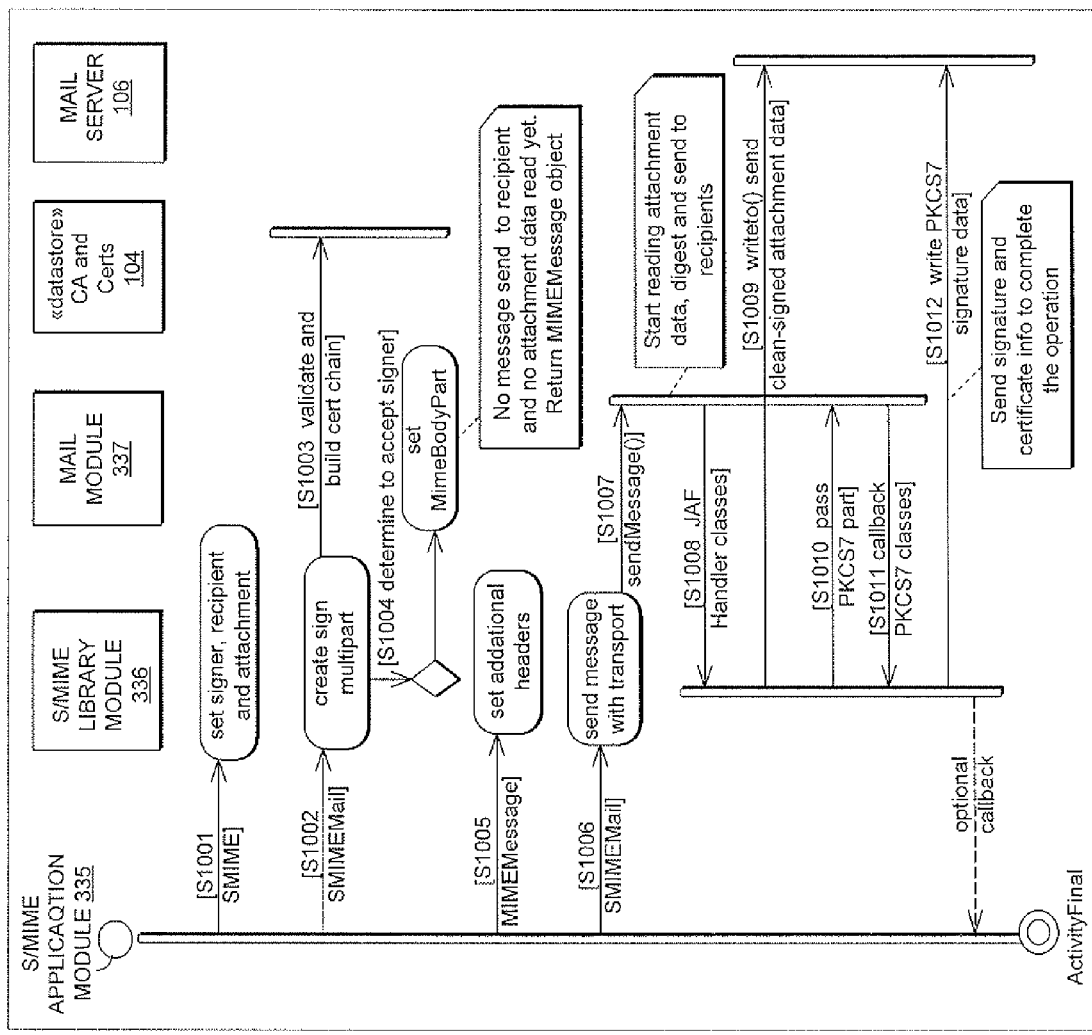
FIG. 10 is sequence diagram for explaining a process for sending a signed e-mail message according to an example embodiment.

FIG. 10 is sequence diagram for explaining a process for sending a signed e-mail message according to an example embodiment. At step S1001, S/MIME application module 335 sets the signer information, recipient information, and attachment information. At step S1002, S/MIME application module 335 calls the sign( )method of the SMIMEMail object, and at step S1003, S/MIME message module 403 validates the signer certificate specified by the signer information of the SMIMEMail object by validating a certificate list (i.e., certificate chain) for the signer certificate.

If the signer information does not specify a signer certificate list for the signer certificate, S/MIME message module 403 validates the signer certificate by building a certificate chain for the signer certificate, and validates the certificate chain.

If a configuration setting specifies that Certificate Revocation List (CRL) chain validation is to be performed, S/MIME message module 403 builds a CRL chain for the signer certificate, and validates the CRL chain. If a configuration setting specifies that Online Certificate Status Protocol (OCSP) validation is to be performed, S/MIME message module 403 validates the signer certificate using OCSP. If a configuration setting specifies that both CRL chain validation and OCSP validation are to be performed, S/MIME message module 403 first performs OCSP validation, and then performs CRL chain validation if OCSP validation cannot be performed, or if problems are encountered.

In another embodiment, a CRL chain is sent to recipients which perform CRL validation of the signer certificate.

If the signer certificate is valid (step S1004), S/MIME message module 403 packs the signer information, recipient information, and attachment information into a MimeMessage object, and returns the packaged MimeMessage object to S/MIME application module 335, in a manner similar to that described above with respect to step S506 of FIG. 5.

At step S1005, after receiving the packaged MimeMessage, S/MIME application module 335 adds additional message headers to the MimeMessage object if it is determined that additional message headers are to be added to the MimeMessage object.

At step S1106, S/MIME application module 335 calls a sendMessage( )method of the SMIMEMail object to send the e-mail message represented by the MimeMesasge object received at step S1004.

At step S1007, in response to the SMIMEMail object receiving the call to the sendMessage( )method, S/MIME message module 403 calls a transport.sendMessage( ) method of JavaMail API module 404 (which is included in mail module 337).

At step S1008, in response to receiving the call to the transport.sendMessage( ) method, JavaMail API module 404 creates an output data stream for streaming the e-mail message represented by the MimeMessage object from sending device 101 to a mail server specified by the recipient information (e.g., mail server 106), and connected to sending device 101 via network 107. After creating the output data stream, JavaMail API module 404 calls S/MIME JavaMail/JAF callback handler module 401 (which is registered as the callback class for the MimeMessage object, as described above for step S506 of FIG. 5), and passes a pointer to the output data stream to S/MIME handler module 401.

At step S1009, in response to receiving the callback from JavaMail API module 404, S/MIME JavaMail/JAF callback handler module 401 sends the header attributes of the MimeMesage object to the mail server via the output data stream, and then sends the header attributes of the attachment MimeBodyPart object to the mail server via the output data stream. After sending the attachment MimeBodyPart object header attributes, S/MIME JavaMail/JAF callback handler module 401 sends the attachment MimeBodyPart object content by calling streaming module 406 (which includes the SMIMESignedAttachment object class).

After receiving the call from S/MIME JavaMail/JAF callback handler module 401, streaming module 406 gets a pointer to an input data stream for the attachment file locations contained in the attachment MimeBodyPart object of the MimeMessage object. Streaming module 406 sends the input data stream pointer to S/MIME JavaMail/JAF callback handler module 401.

After receiving the pointer to the requested input data stream, attachment S/MIME JavaMail/JAF callback handler module 401 calls a streaming method of JavaMail API module 404 to read the attachment data via the input data stream, and pass the streamed attachment data to streaming module 406, via S/MIME JavaMail/JAF callback handler module 401. In particular, JavaMail API module 404 calls a MultipartSigned class in S/MIME JavaMail/JAF callback handler module 401, and then the MultipartSigned class calls the SMIMESignedAttachment object class in streaming module 406 via an interface mechanism.

In response to receiving the call from S/MIME JavaMail/JAF callback handler module 401, JavaMail API module 404 reads the attachment data from the input data stream, and calls streaming module 406. In response, streaming module 406 receives data from the specified data source location to stream the attachment data to the mail server via the output data stream. While streaming the data, streaming module 406 also calculates the message digest value.

Streaming module 406 receives streamed attachment data from the specified data source location, and buffers the received attachment data in a buffer memory (e.g., RAM 316). After a predetermined number of bytes of attachment data is buffered in the buffer memory, the buffered portion of the attachment data is digested (using the digest algorithm information specified by the signer information) to generate a message digest value at the same time that the buffered portion of the attachment data is sent to the mail server via the output data stream. The digest value is updated as additional portions of the streamed attachment data are received and digested.

After streaming module 406 sends all attachment data specified by the attachment information to the mail server, streaming module 406 passes the generated digest value to S/MIME JavaMail/JAF callback handler module 401.

After receiving the generated divest value, S/MIME JavaMail/JAF callback handler module 401 calls signing module 407 to generate the digest value using the signer specified by the signer information, thereby creating the PKCS7 signature data.

After generating the PKCS7 signature data, signing module 407 calls S/MIME JavaMail/JAF callback handler module 401, which calls an encoding method of mail module 337 to apply Base64 transfer encoding to the PKCS7 signature data (step S1010). Mail module 337 creates a Base64 output data stream (e.g., a Base64EncoderStream that wraps an SMTPOutputStream via SMIMEStreamPKCSHandler class) for streaming the clear-text PKCS7 signature data of the e-mail message represented by the MimeMes sage object. After creating the Base64 output data stream, mail module 337 calls S/MIME JavaMail/JAF callback handler module 401 (which is registered as the callback class for the MimeMessage object, as described above for step S506 of FIG. 5), and passes a pointer to the Base64 output data stream to S/MIME JavaMail/JAF callback handler module 401 (step S1011).

At step S1012, S/MIME JavaMail/JAF callback handler module 401 passes the pointer to the Base64 output data stream to signing module 407, which buffers the Base64-transfer-encoded PKCS7 signature data in the buffer memory, and writes the buffered PKCS7 signature data to the mail server via the Base64 output data stream.

Figure 11:
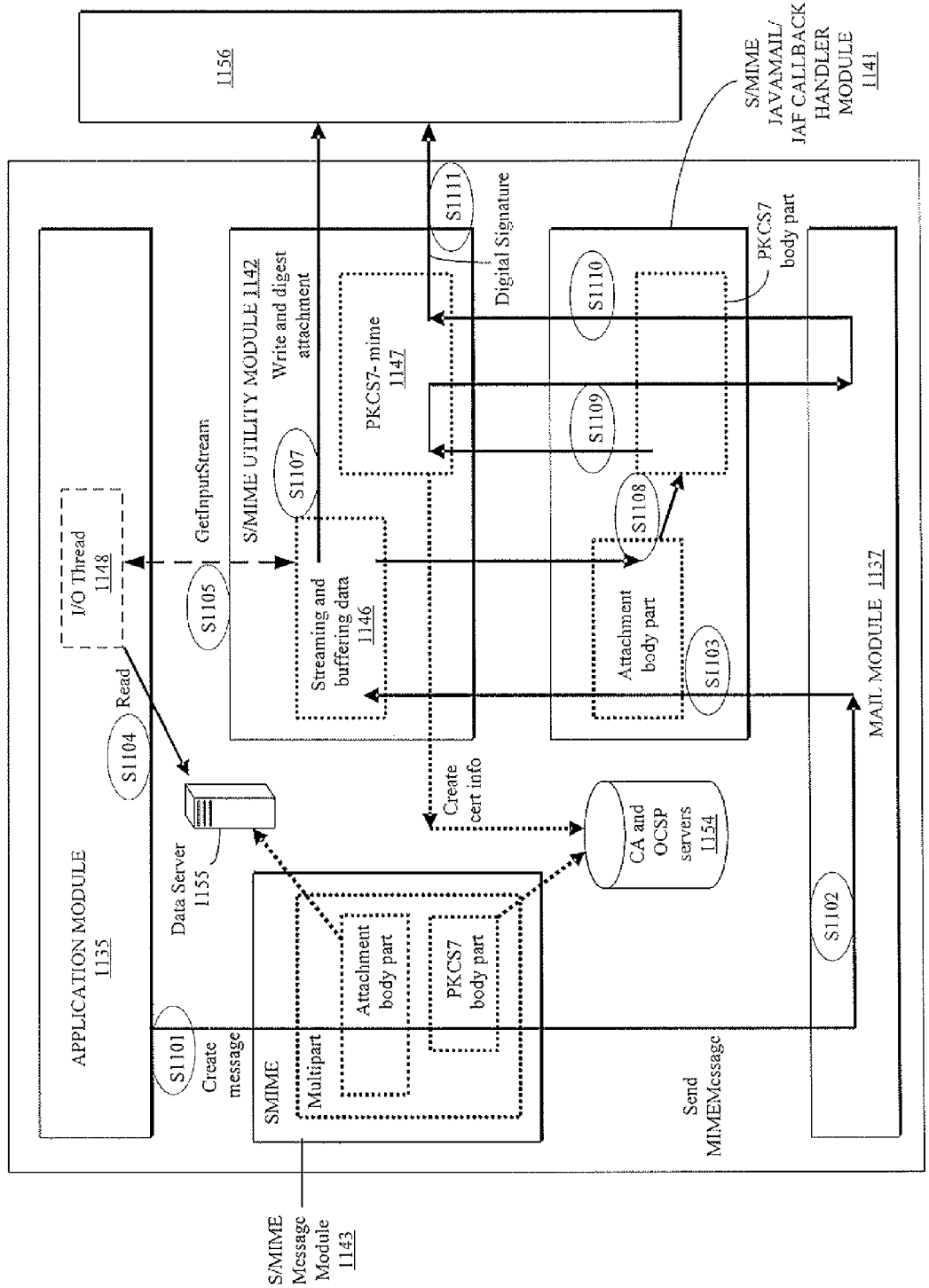
FIG. 11 is a view for explaining a process for sending an e-mail message according to an example embodiment.

FIG. 11 is a view for explaining a process for sending an e-mail message, wherein the S/MIME application module controls the streaming of the attachment data according to an example embodiment. Steps S1101, S1102, S1103, S1107, S1108, S1109, S1110, and S1111 are similar to steps S601, S602, S603, S607, S608, S609, S610, and S611 of FIG. 6.

S/MIME application module 1135 is similar to S/MIME application module 335 of FIG. 6, S/MIME message module 1143 is similar to S/MIME message module 403 of FIG. 6, mail module 1137 is similar to mail module 337 of FIG. 6, S/MIME JavaMail/JAF callback handler module 1141 is similar to S/MIME JavaMail/JAF callback handler module 401 of FIG. 6, S/MIME utility module 1142 is similar to S/MIME utility module 402 of FIG. 6. Streaming module 1146 is similar to streaming module 406 of FIG. 6, and signing module 1147 is similar to signing module 407 of FIG. 6. Data server 1155 is similar to data server 105 of FIG. 1, mail server 1156 is similar to mail server 106 of FIG. 1, and CA/OCSP server 1154 is similar to CA/OCSP server 104 of FIG. 1.

In step S1101, S/MIME application module 1135 sets attachment information, which includes a pointer to I/O thread 1148 in S/MIME application module 1135, and which includes locations of attachment data. S/MIME application module 1135 passes the attachment information to S/MIME message module 1143.

At step S1104, streaming module 1146 calls I/O thread 1148 (using the pointer to I/O thread 1148 contained in the attachment information) to get a pointer to an input data stream for the attachment file locations contained in the attachment MimeBodyPart object of the MimeMes sage object. At step S1105, after receiving the input data stream pointer, streaming module 1146 reads the attachment data from the input data stream via I/O thread 1148. Because streaming module 1146 reads the attachment data from the input data stream via I/O thread 1148, S/MIME application module 1135 can control the read operation, and can stop the read operation at any position, thereby providing a cancel operation.

If I/O thread 1148 stops the read operation before all the attachment data is read, thereby cancelling the message, only part of the attachment data is sent to the mail server. Because the digest value used to create the digital signature is generated by digesting the attachment data as it is read and sent to the mail server, and the digest value is updated as additional portions of the streamed attachment data are received and digested, the digest value represents the attachment data that has been sent to the mail server. Therefore, since the digest value used to create the digital signature represents the attachment data that has been sent to the mail server, the recipient of the partially sent e-mail message can verify the signer's digital signature for the partially-sent e-mail message.

In an example embodiment, if I/O thread 1148 stops the read operation before all the attachment data is read, and the message is partially sent, streaming module 1146 adds information to the message content of the partially sent e-mail message to indicate that the message is a partially sent e-mail message. The additional information can have a text format, a .pdf (Postcript Data File) format, a .tiff format, an .img format, a .doc format, a .zip format, or any other suitable type of data format.

In an example embodiment, if I/O thread 1148 stops the read operation before all the attachment data is read, and the message is partially sent, S/MIME application module 1135 adds additional information to the attachment data (for a partially sent attachment) of the partially sent e-mail message (via I/O thread 1148) to indicate that the message is a partially sent e-mail message. If the message includes more than one attachment file, the additional information is added to the attachment file that is partially sent. For example, if five attachment files are to be sent, and a cancel operation is performed after the third attachment file is partially sent, then the additional information is added to the third attachment file. The additional information has the same data format as the attachment file that is partially sent.

In an example embodiment, if I/O thread 1148 stops the read operation before all the attachment data is read, and the message is partially sent, S/MIME application module 1135 adds additional information to the partially-sent e-mail message as a new attachment (via I/O thread 1148) to indicate that the message is a partially sent e-mail message. The additional information can have a text format, a .pdf (Postcript Data File) format, a .tiff format, an .img format, a .doc format, a .zip format, or any other suitable type of data format.

Figure 12:
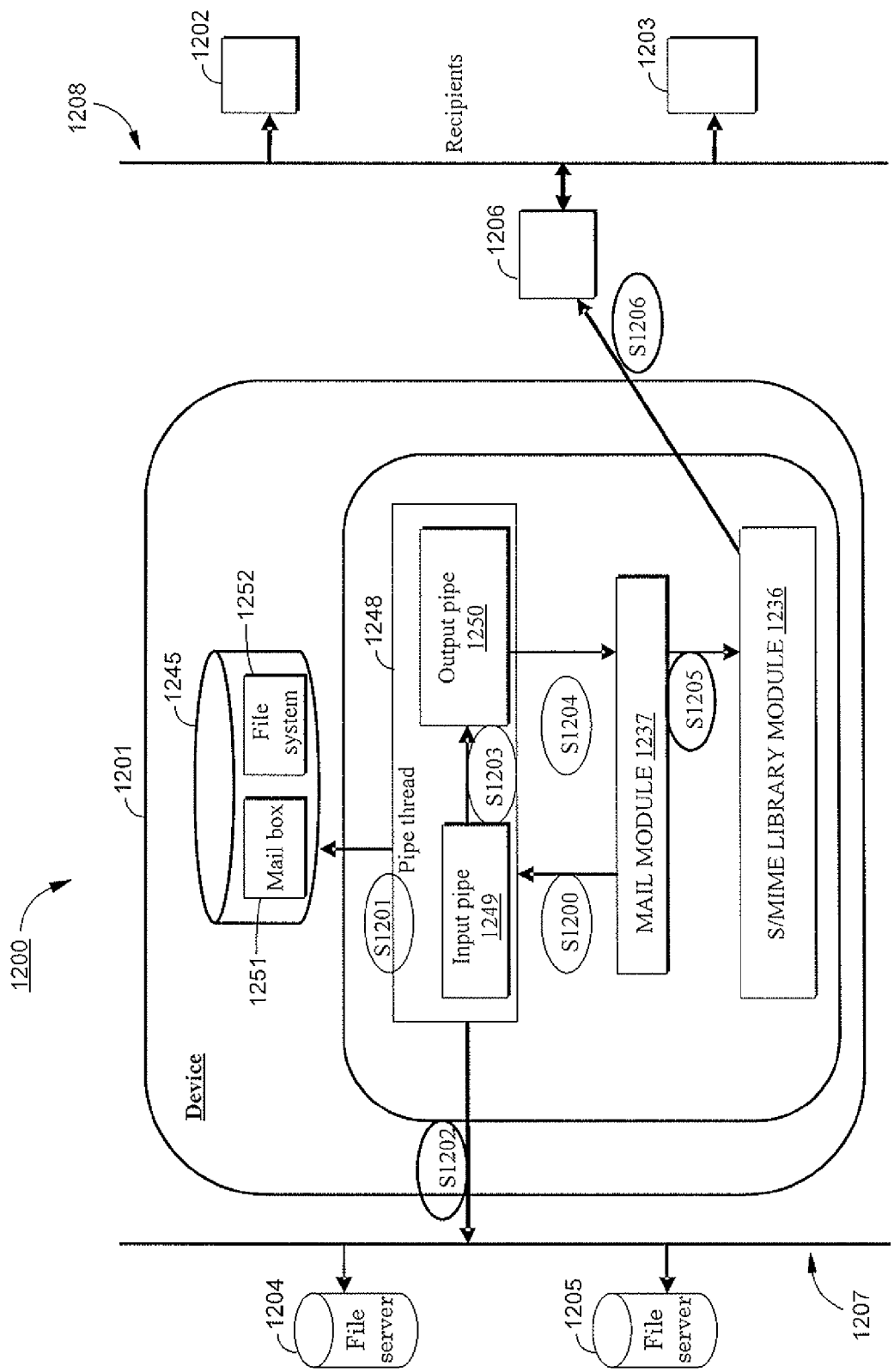
FIG. 12 is a view for explaining a piping thread mechanism for sending data according to an example embodiment

FIG. 12 is a view for explaining a piping thread mechanism for sending attachment data according to an example embodiment. S/MIME system 1200 includes sending device 1201, recipient devices 1202 and 1203, data servers 1204 and 1205, mail server 1206, and networks 1207 and 1208. Sending device 1201 is similar to sending device 101 of FIG. 1, recipient devices 1202 and 1203 are similar to recipient devices 102 and 103 of FIG. 1, data servers 1204 and 1205 are similar to data server 105 of FIG. 1, and mail server 1206 is similar to mail server 106 of FIG. 1. Data servers 1204 and 1205, and sending device 1201 are interconnected via network 1207. Sending device 1201, mail server 1206, and recipient devices 1202 and 1203 are interconnected via network 1208.

Network 1207 is an intranet, but in other embodiments, network 1207 can be the Internet, or any other suitable type of network for sending e-mail messages. Network 1208 is an intranet, but in other embodiments, network 1208 can be the Internet, or any other suitable type of network for sending e-mail messages.

Sending device 1201 includes hard disk 1245. Hard disk 1245 contains an operating system and application programs (encoded in machine-executable instructions). Hard disk 1245 also contains device drivers for software interface to devices, such as input device drivers, output device drivers, and other device drivers. Hard disk 1245 also contains mail box module 1251 (encoded in machine-executable instructions) and file system module 1252 (encoded in machine-executable instructions). Hard disk 1245 further contains an S/MIME application module (similar to S/MIME application module 335 of FIG. 3) that includes I/O thread 1248, and hard disk 1245 includes S/MIME library module 1236 and mail module 1237.

S/MIME library module 1236 is similar to S/MIME library module 336, mail module 1237 is similar to mail module 337, and I/O thread 1248 is similar to I/O thread 1148. I/O thread 1248 includes input pipe 1249 and output pipe 1250.

Input pipe 1249 is an input data stream for the attachment file locations contained in attachment information received from a user, and output pipe 1250 is an output data stream for outputting the data read from input pipe 1249.

S/MIME library module 1236 receives signer information, recipient information, and attachment information from a user of sending device 1201, and S/MIME library module 1236 packs the received signer information, recipient information, and attachment information into a MimeMessage object, and returns the packaged MimeMessage object to the S/MIME application module, as described above with respect to step S506 of FIG. 5.

At step S1200, the user of sending device 1201 presses a "start send" button on a keyboard of sending device 1201, and in response, the S/MIME application calls a transport.sendMessage( )method of mail module 1237 (which includes a JavaMail API module similar to JavaMail API module 404 of FIG. 4). In response to receiving the call to the transport.sendMessage( )method, mail module 1237 creates an output data stream for streaming the e-mail message represented by the MimeMessage object from sending device 1201 to a mail server specified by the recipient information (e.g., mail server 1206), and connected to sending device 1201 via network 1208. After creating the output data stream, mail module 1237 calls input pipe 1249 to read attachment data from a data source (e.g., data in mailbox module 1251 or file system module 1252 located on hard disk 1245), or remote locations, such as, for example, locations on data servers 1204 and 1205).

In the case that the attachment data is stored in device local storage (step S1201), for real-time scan and copy data stored in mailbox module 1251 or file system module 1252 (i.e., real-time data obtained as a document is scanned or copied by sending device 1201), when a document security level is enforced by S/MIME system 1200, sending device 1201 obtains a security tag (such as a barcode, or any other suitable type of security tag) from an image of a scanned or copied document to determine the document security requirements. Based on the obtained security tag, the S/MIME application determines if the message should be sent or not.

In the case that the attachment data is in a remote location (step S1202), such as, for example, locations on data servers 1204 and 1205, file attachments are retrieved from the location specified, and if a document security requirement is enforced by S/MIME system 1200, the attachment file contains a flag to indicate the document security requirements.

At step S1203, attachment data is read from input pipe 1249 and written to output pipe 1250. At step S1204, mail module 1237 receives attachment data from output pipe 1250, and passes the attachment data to S/MIME library module 1236.

At step S1205, S/MIME library module 1236 receives streamed attachment data from mail module 1237, and buffers the received attachment data in a buffer memory (e.g., a RAM). After a predetermined number of bytes of attachment data is buffered in the buffer memory, at step S1206, the buffered portion of the attachment data is digested (using a digest algorithm) to generate a message digest value at the same time that the buffered portion of the attachment data is sent to the mail server via the output data stream created by mail module 1237 at step S1200. The digest value is updated as additional portions of the streamed attachment data are received and digested.

After S/MIME library module 1236 sends all attachment data specified by the attachment information to the mail server, S/MIME library module 1236 generates the PKCS7 signature data using the signer specified by the signer information. S/MIME library module 1236 calls an encoding method of mail module 1237 to apply Base64 transfer encoding to the PKCS7 signature data. Mail module 1237 creates a Base64 output data stream (e.g., a Base64EncoderStream that wraps an SMTPOutputStream via SMIMEStreamPKCSHandler class) for streaming the clear-text PKCS7 signature data of the e-mail message represented by the MimeMessage object. After creating the Base64 output data stream, mail module 1237 calls S/MIME library module 1236, and passes a pointer to the Base64 output data stream to S/MIME library module 1236. S/MIME library module 1236 buffers the Base64-transfer-encoded PKCS7 signature data in the buffer memory, and writes the buffered PKCS7 signature data to the mail server via the Base64 output data stream.

Figure 13:
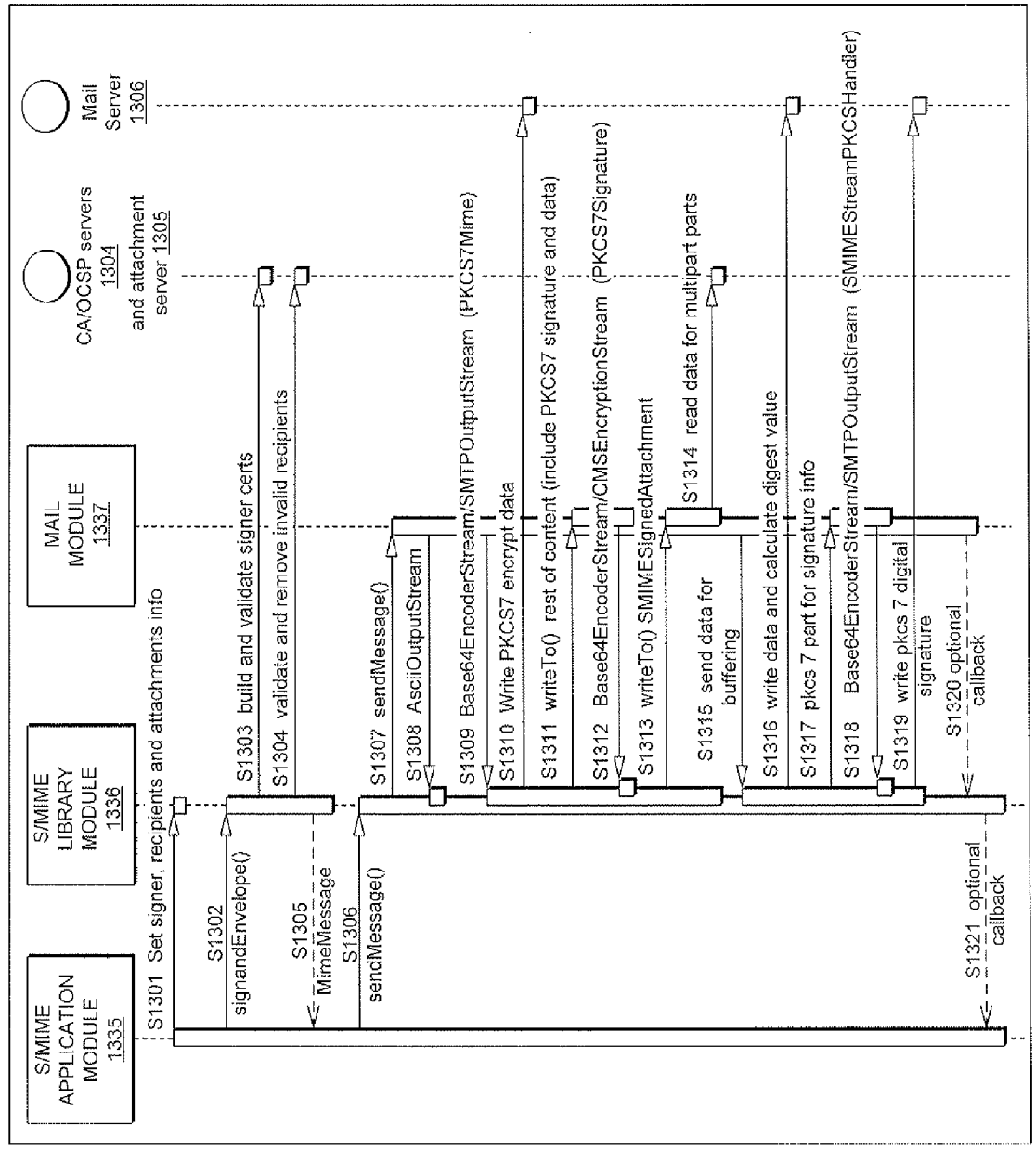
FIG. 13 is sequence diagram for explaining a process for sending a signed and then encrypted e-mail message according to an example embodiment.

FIG. 13 is sequence diagram for explaining a process for sending a signed and then encrypted e-mail message according to an example embodiment. At step S1301, S/MIME application module 1335 utilizes classes in S/MIME library module 1336 (which is similar to S/MIME library module 336 of FIG. 3) to set signer information, recipient information, and attachment information. At step S1302, S/MIME application module 1335 calls a signAndEnvelope( ) method in S/MIME library module 1336 to build a MimeMessage object. At step S1303, S/MIME library module 1336 validates signer certificates specified by the set signer information. If a configuration setting specifies that certificate chain validation is to be performed, S/MIME library module 1336 builds a certificate chain and Certificate Revocation List (CRL) chain for the signer certificate, and validates the certificate chain and the CRL chain. In other example embodiments, OCSP can be used instead of, or in addition to, CRL to validate the signer certificate.

At step S1304, S/MIME library module 1336 builds certificate chains and Certificate Revocation List (CRL) chains for the certificates for recipients included in the recipient information, and validates the certificate chains and the CRL chains. In other example embodiments, OCSP can be used instead of, or in addition to, CRL to validate the recipient certificates. S/MIME library module 1336 removes invalid recipients from the list of recipients included in the recipient information. If there are no recipients that are valid, then a message will not be sent.

At step S1305, if it is determined that the signer certificate and the recipient certificates are acceptable, according to configuration settings set by S/MIME application module 1335, the S/MIME library module 1336 will utilize functions (e.g., JavaMail API functions) in mail module 1337 (which is similar to mail module 337 of FIG. 3) to pack the received signer information, recipient information, and attachment information into a MimeMessage object, and return the packaged MimeMessage object to S/MIME application module 1335, in a manner similar to that as described above with respect to step S506 of FIG. 5. After receiving the packaged MimeMessage, S/MIME application module 1335 adds additional message headers to the MimeMessage object if it is determined that additional message headers are to be added to the MimeMessage object.

At step S1306, S/MIME application module 1335 calls a sendMessage( )method in S/MIME library module 1336 to send the e-mail message represented by the MimeMesasge object received at step S1305. At step S1307, in response to receiving the call to the sendMessage( )method, S/MIME library module 1336 calls a transport.sendMessage( )method of a JavaMail API module (which is included in mail module 1337).

At step S1308, in response to receiving the call to the transport.sendMessage( ) method, mail module 1337 creates an output data stream (e.g., an AsciiOutputStream object) for streaming an encrypted e-mail message represented by the MimeMessage object from a sending device (similar to 101 of FIG. 1) to a mail server (similar to mail server 106 of FIG. 1) specified by the recipient information, and connected to the sending device via a network (similar to network 107 of FIG. 1). After creating the output data stream, mail module 1337 calls S/MIME library module 1336 (which is registered as the callback class for the MimeMessage object, in a manner similar to that described above for step S506 of FIG. 5), and passes a pointer to the output data stream to S/MIME library module 1336. S/MIME library module 1336 rejects the output data stream.

In response to S/MIME library module 1336 rejecting the output data stream, at step S1309, mail module 1337 creates a Base64 output data stream (e.g., a Base64EncoderStream that wraps an SMTPOutputStream via PKCS7Mime class) for streaming the clear-text header attributes and PKCS7 encrypted information of the e-mail message represented by the MimeMessage object. After creating the Base64 output data stream, mail module 1337 calls S/MIME library module 1336 (which is registered as the callback class for the MimeMessage object, in a manner similar to that described above for step S506 of FIG. 5), and passes a pointer to the Base64 output data stream to S/MIME library module 1336.

At step S1310, in response to receiving the callback from mail module 1337, S/MIME library module 1336 sends the header attributes of the MimeMesage object to the mail server via the Base64 output data stream, sends PKCS7 encrypted information (which includes recipients' certificates), and then sends the header attributes of the attachment MimeBodyPart object to the mail server via the Base64 output data stream.

As step S1311, S/MIME library module 1336 starts processing PKCS7 signature data and calls a method in mail module 1337 to create an Encryption output data stream (e.g., a CMSEncryptionStream object embedded inside a Base64EncoderStream via PKCS7Siganture class) for streaming the encrypted attachment data of the encrypted e-mail message represented by the MimeMessage object from the sending device to the mail server. After creating the Encrypted output data stream, at step S1312, mail module 1337 calls S/MIME library module 1336, and passes a pointer to the Encryption output data stream to S/MIME library module 1336.

At step S1313, S/MIME library module 1336 gets a pointer to an input data stream for the attachment file locations contained in the attachment MimeBodyPart object of the MimeMes sage object, and calls a streaming method of mail module 1337 to read the attachment data via the input data stream. In response to receiving the call from S/MIME library module 1336, at step S1314, mail module 1337 reads the attachment data from the input data stream, and calls S/MIME library module 1336 to write the streamed attachment data to the mail server via the Encryption output data stream.

At step S1315, S/MIME library module 1336 receives streamed attachment data from mail module 1337, and buffers the received attachment data in a buffer memory (e.g., a RAM). After a predetermined number of bytes of attachment data is buffered in the buffer memory, at step S1316, S/MIME library module 1336 digests the buffered portion of the attachment data (using digest algorithm information specified by the signer information) to generate a message digest value at the same time that the buffered portion of the attachment data is sent to the mail server via the Encryption output data stream, wherein the attachment data is encrypted as it is output via the Encryption output data stream. The digest value is updated as additional portions of the streamed attachment data are received and digested.

At step S1317, after S/MIME library module 1336 sends all attachment data specified by the attachment information to the mail server, S/MIME library module 1336 generates the PKCS7 signature data using the signer that is specified by the signer information. After generating the PKCS7 signature data, S/MIME library module 1336 calls an encoding method of mail module 1337 to apply Base64 transfer encoding to the PKCS7 signature data. Mail module 1337 creates a Base64 output data stream (e.g., a Base64EncoderStream that wraps an SMTPOutputStream via SMIMEStreamPKCSHandler class) for streaming the clear-text PKCS7 signature data of the e-mail message represented by the MimeMessage object.

At step S1318, after creating the Base64 output data stream, mail module 1337 calls S/MIME library module 1336 (which is registered as the callback class for the MimeMessage object, in a manner similar to that described above for step S506 of FIG. 5), and passes a pointer to the Base64 output data stream to S/MIME library module 1336.

At step S1319, S/MIME library module 1336 buffers the Base64-transter-encoded PKCS7 signature data in the buffer memory, and then writes the buffered PKCS7 signature data to the mail server via the Base64 output data stream.

In the example embodiment, there are callbacks at steps S1320 and S1321 to notify S/MIME application module 1337 of the status of the send and then encrypt operation.

Figure 14:
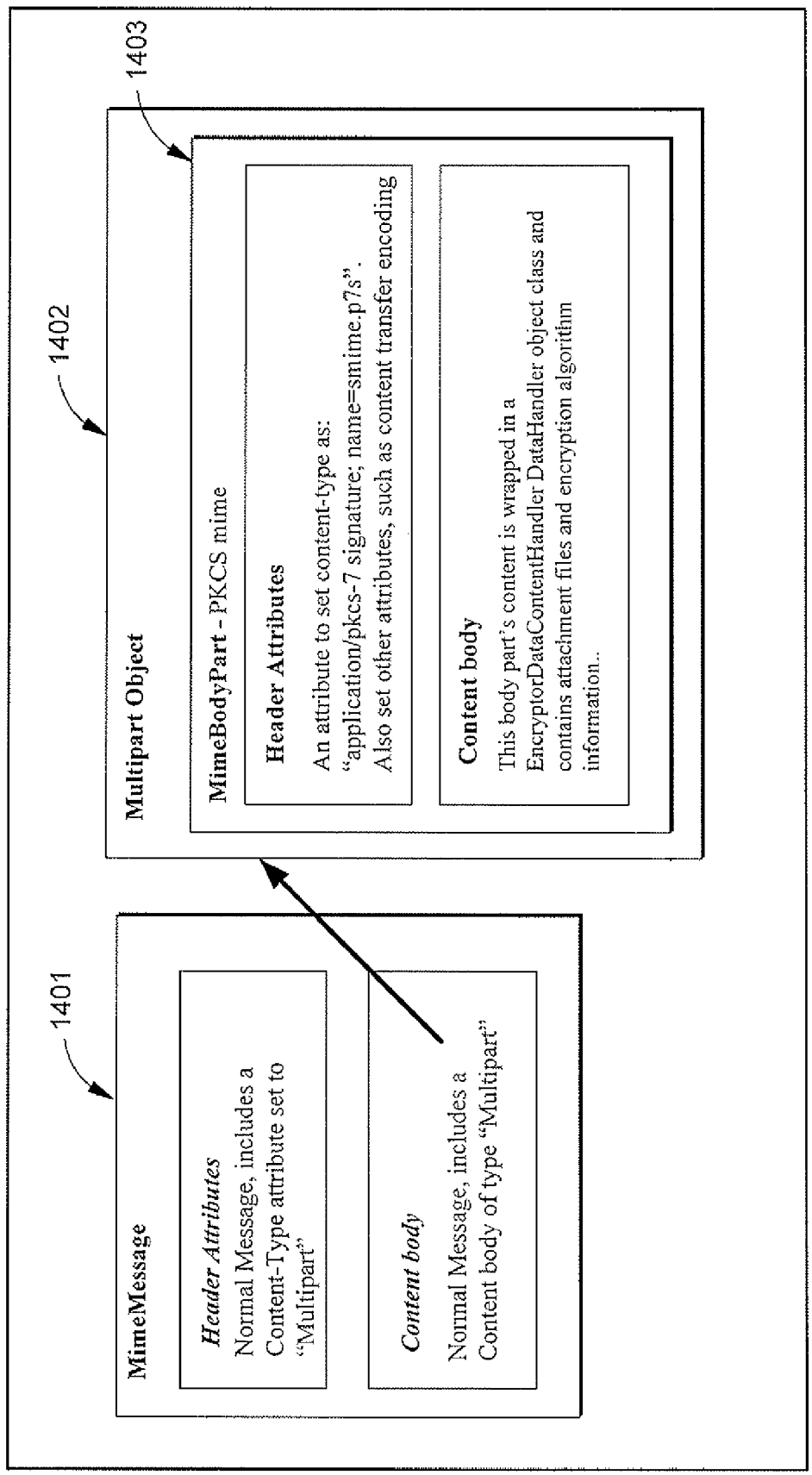
FIG. 14 illustrates the structure and content of a signed and then encrypted e-mail message according to an example embodiment.

FIG. 14 illustrates the structure and content of a multipart message object for an enveloped (i.e., encrypted) e-mail message according to an example embodiment. As shown in FIG. 14, MimeMessage 1401 is a message object where the Content-Type is set to "multipart", and the Content Body carries a reference to MimeMultipart object 1402. MimeMultipart object 1402 is a container of one MimeBodyPart object, where PKCS mime MimeBodyPart 1403 contains attachment information and encryption algorithm information. As shown in FIG. 14, the content body of MimeBodyPart 1403 is wrapped in an EncryptorDataContentHandler DataHandler object class, and contains attachment information and encryption algorithm information.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for sending a signed e-mail message to a mail server from a device that communicates with the mail server over a network, the signed e-mail message having attachment data and signature data, said method comprising:
   receiving signer information, recipient information and attachment information;
   packaging the signer information, recipient information, and attachment information into an e-mail message having a clear-signed secure e-mail exchange format that includes an attachment body part and a signature body part, wherein the attachment body part contains the location of at least one attachment file included in the attachment information, and wherein the signature body part contains the signer information for generating the digital signature;
   creating an output data stream for streaming the e-mail message from the device to a mail server specified by the recipient information;
   processing the attachment body part to acquire at least one input data stream for the at least one attachment file location contained in the attachment body part;
   reading attachment data from the at least one input data stream;
   in response to receiving a portion of the attachment data from the at least one input data stream, digesting the received portion of the attachment data to generate a digest value, and sending the received portion of the attachment data to the mail server via the output data stream, wherein the received portion of the attachment data is smaller than the size of the attachment data, and wherein the digest value is updated as additional portions of the streamed attachment data are received and digested; and
   in response to sending all attachment data specified by the attachment information to the mail server, processing the signature body part to acquire a signer specified by the signer information contained in the signature body part, generating the signature data by using the signer to sign the digest value using a signer's private key, and sending the generated signature data to the mail server via the output data stream.

2. The method according to claim 1, wherein the e-mail message has an S/MIME format, and wherein the signature data has a PKCS7 content type.

3. The method according to claim 1, wherein the signer includes at least one of a secure e-mail library module, an application module, and a smart card.

4. The method according to claim 1, wherein the received portion of the attachment data is encrypted before being sent to the mail server via the output data stream.

5. The method according to claim 1, wherein the device includes a multi-function printer (MFP).

6. The method according to claim 5, wherein the streamed attachment data is generated by at least one of a scan operation and a copy operation of the MFP.

7. The method according to claim 1, wherein the attachment body part contains signer's digest algorithm information specified by the signer information.

8. The method according to claim 1, wherein the received portion of the attachment data is digested using a digest algorithm that includes at least one of an MD5 (Message-Digest algorithm 5) digest algorithm, a Secure Hash Algorithm(SHA)-1 digest algorithm, and an SHA-2 digest algorithm, wherein the SHA-2digest algorithm includes at least one of an SHA-224 digest algorithm, an SHA-256 digest algorithm, an SHA-384 digest algorithm, and an SHA-512 digest algorithm.

9. The method according to claim 1, wherein responsive to a cancel instruction received from a user of the device, the signer specified by the signer information generates the signature data, and the generated signature data is sent to the mail server via the output data stream, such that a partially sent e-mail message is signed.

10. The method according to claim 9, wherein information is added to the message content of the partially sent e-mail message to indicate that the message is a partially sent e-mail message.

11. The method according to claim 9, wherein additional information is added to the attachment data of the partially sent e-mail message to indicate that the message is a partially sent e-mail message, wherein if the message includes a plurality of attachment files, the information is added to the attachment file that is partially sent.

12. The method according to claim 9, wherein information indicating that the message is a partially sent e-mail message is added to the partially sent e-mail message as a new attachment.

13. The method according to claim 1, wherein an application programming interface defined by a Java e-mail computing environment and an application programming interface defined by a Java object computing environment are used to send the signed e-mail message.

14. The method according to claim 1, wherein the received portion of the read attachment data is buffered in a memory buffer, wherein a capacity of the memory buffer is smaller than a size of the attachment data specified by the attachment information, wherein the buffered portion of the attachment data is digested to generate the digest value and sent to the mail server via the output data stream, and wherein after the buffered portion of the attachment data is digested and sent to the mail server, additional portions of the streamed attachment data are buffered in the memory buffer.

15. A module which sends a signed e-mail message to a mail server from a device that communicates with the mail server over a network, the signed e-mail message having attachment data and signature data, said module comprising:
   an information module constructed to perform a receiving step in which signer information, recipient information and attachment information are received;
   a message module constructed to perform a packaging step in which the signer information, recipient information, and attachment information are packaged into an e-mail message having a clear-signed secure e-mail exchange format that includes an attachment body part and a signature body part, wherein the attachment body part contains the location of at least one attachment file included in the attachment information and signer's digest algorithm information specified by the signer information, and wherein the signature body part contains the signer information for generating the digital signature;
   a mail module constructed to perform a creating step in which an output data stream is created for streaming the e-mail message from the device to a mail server specified by the recipient information;

a streaming module constructed to perform a processing step in which the attachment body part is processed to acquire at least one input data stream for the at least one attachment file location contained in the attachment body part;

a reading module constructed to perform a reading step in which attachment data is read from the at least one input data stream;

a sending module constructed to perform, in response to receiving a portion of the attachment data from the at least one input data stream, a sending step in which the received portion of the attachment data is digested to generate a digest value, and the received portion of the attachment data is sent to the mail server via the output data stream, wherein the received portion of the attachment data is smaller than the size of the attachment data, and wherein the digest value is updated as additional portions of the streamed attachment data are received and digested; and a signing module constructed to perform, in response to sending all attachment data specified by the attachment information to the mail server, a signing step in which the signature body part is processed to acquire a signer specified by the signer information contained in the signature body part, the signature data is generated by using the signer to sign the digest value using a signer's private key, and the generated signature data is sent to the mail server via the output data stream.

16. The module according to claim 15, wherein the e-mail message has an S/MIME format, and wherein the signature data has a PKCS7 content type.

17. The module according to claim 15, wherein the signer includes at least one of a secure e-mail library module, an application module, and a smart card.

18. The module according to claim 15, wherein the received portion of the attachment data is encrypted before being sent to the mail server via the output data stream.

19. The module according to claim 15, wherein the device includes a multi-function printer (MFP).

20. The module according to claim 19, wherein the streamed attachment data is generated by at least one of a scan operation and a copy operation of the MFP.

21. The module according to claim 15, wherein the attachment body part contains signer's digest algorithm information specified by the signer information.

22. The module according to claim 15, wherein the received portion of the attachment data is digested using a digest algorithm that includes at least one of an MD5 (Message-Digest algorithm 5) digest algorithm, a Secure Hash Algorithm(SHA)-1 digest algorithm, and an SHA-2 digest algorithm, wherein the SHA-2digest algorithm includes at least one of an SHA-224 digest algorithm, an SHA-256 digest algorithm, an SHA-384 digest algorithm, and an SHA-512 digest algorithm.

23. The module according to claim 15, wherein responsive to a cancel instruction received from a user of the device, the signer specified by the signer information generates the signature data, and the generated signature data is sent to the mail server via the output data stream, such that a partially sent e-mail message is signed.

24. The module according to claim 23, wherein information is added to the message content of the partially sent e-mail message to indicate that the message is a partially sent e-mail message.

25. The module according to claim 23, wherein additional information is added to the attachment data of the partially sent e-mail message to indicate that the message is a partially sent e-mail message, wherein if the message includes a plurality of attachment files, the information is added to the attachment file that is partially sent.

26. The module according to claim 23, wherein information indicating that the message is a partially sent e-mail message is added to the partially sent e-mail message as a new attachment.

27. The module according to claim 15, wherein an application programming interface defined by a Java e-mail computing environment and an application programming interface defined by a Java object computing environment are used to send the signed e-mail message.

28. The module according to claim 15, wherein the received portion of the read attachment data is buffered in a memory buffer, wherein a capacity of the memory buffer is smaller than a size of the attachment data specified by the attachment information, wherein the buffered portion of the attachment data is digested to generate the digest value and sent to the mail server via the output data stream, and wherein after the buffered portion of the attachment data is digested and sent to the mail server, additional portions of the streamed attachment data are buffered in the memory buffer.

29. An apparatus comprising:

a computer-readable memory constructed to store computer-executable process steps; and a processor constructed to execute the computer-executable process steps stored in the memory;

wherein the process steps stored in the memory cause the processor to send a signed e-mail message to a mail server from the apparatus, which communicates with the mail server over a network, the signed e-mail message having attachment data and signature data, wherein the process steps include computer-executable process steps to:

receive signer information, recipient information and attachment information;

package the signer information, recipient information, and attachment information into an e-mail message having a clear-signed secure e-mail exchange format that includes an attachment body part and a signature body part, wherein the attachment body part contains the location of at least one attachment file included in the attachment information and signer's digest algorithm information specified by the signer information, and wherein the signature body part contains the signer information for generating the digital signature;

create an output data stream for streaming the e-mail message from the device to a mail server specified by the recipient information;

process the attachment body part to acquire at least one input data stream for the at least one attachment file location contained in the attachment body part;

read attachment data from the at least one input data stream;

in response to receiving a portion of the attachment data from the at least one input data stream, digest the received portion of the attachment data to generate a digest value, and send the received portion of the attachment data to the mail server via the output data stream, wherein the received portion of the attachment data is smaller than the size of the attachment data, and wherein the digest value is updated as additional portions of the streamed attachment data are received and digested; and in response to sending all attachment data specified by the attachment information to the mail server, process the signature body part to acquire a signer specified by the signer information contained in the signature body part, generate the signature data by using the signer to sign the digest value using a signer's private key, and send the generated signature data to the mail server via the output data stream.

30. The apparatus according to claim 29, wherein the e-mail message has an S/MIME format, and wherein the signature data has a PKCS7 content type.

31. The apparatus according to claim 29, wherein the signer includes at least one of a secure e-mail library module, an application module, and a smart card.

32. The apparatus according to claim 29, wherein the received portion of the attachment data is encrypted before being sent to the mail server via the output data stream.

33. The apparatus according to claim 29, wherein the device includes a multi-function printer (MFP).

34. The apparatus according to claim 33, wherein the streamed attachment data is generated by at least one of a scan operation and a copy operation of the MFP.

35. The apparatus according to claim 29, wherein the attachment body part contains signer's digest algorithm information specified by the signer information.

36. The apparatus according to claim 29, wherein the received portion of the attachment data is digested using a digest algorithm that includes at least one of an MD5 (Message-Digest algorithm 5) digest algorithm, a Secure Hash Algorithm(SHA)-1 digest algorithm, and an SHA-2 digest algorithm, wherein the SHA-2digest algorithm includes at least one of an SHA-224 digest algorithm, an SHA-256 digest algorithm, an SHA-384 digest algorithm, and an SHA-512 digest algorithm.

37. The apparatus according to claim 29, wherein responsive to a cancel instruction received from a user of the device, the signer specified by the signer information generates the signature data, and the generated signature data is sent to the mail server via the output data stream, such that a partially sent e-mail message is signed.

38. The apparatus according to claim 37, wherein information is added to the message content of the partially sent e-mail message to indicate that the message is a partially sent e-mail message.

39. The apparatus according to claim 37, wherein additional information is added to the attachment data of the partially sent e-mail message to indicate that the message is a partially sent e-mail message, wherein if the message includes a plurality of attachment files, the information is added to the attachment file that is partially sent.

40. The apparatus according to claim 37, wherein information indicating that the message is a partially sent e-mail message is added to the partially sent e-mail message as a new attachment.

41. The apparatus according to claim 29, wherein an application programming interface defined by a Java e-mail computing environment and an application programming interface defined by a Java object computing environment are used to send the signed e-mail message.

42. The apparatus according to claim 29, wherein the received portion of the read attachment data is buffered in a memory buffer, wherein a capacity of the memory buffer is smaller than a size of the attachment data specified by the attachment information, wherein the buffered portion of the attachment data is digested to generate the digest value and sent to the mail server via the output data stream, and wherein after the buffered portion of the attachment data is digested and sent to the mail server, additional portions of the streamed attachment data are buffered in the memory buffer.

43. A non-transitory computer-readable memory medium on which is stored computer-executable process steps for causing a computer to send a signed e-mail message to a mail server from a device that communicates with the mail server over a network, the signed e-mail message having attachment data and signature data, wherein the process steps comprise:

receiving signer information, recipient information and attachment information;

packaging the signer information, recipient information, and attachment information into an e-mail message having a clear-signed secure e-mail exchange format that includes an attachment body part and a signature body part, wherein the attachment body part contains the location of at least one attachment file included in the attachment information and signer's digest algorithm information specified by the signer information, and wherein the signature body part contains the signer information for generating the digital signature;

creating an output data stream for streaming the e-mail message from the device to a mail server specified by the recipient information;

processing the attachment body part to acquire at least one input data stream for the at least one attachment file location contained in the attachment body part;

reading attachment data from the at least one input data stream;

in response to receiving a portion of the attachment data from the at least one input data stream, digesting the received portion of the attachment data to generate a digest value, and sending the received portion of the attachment data to the mail server via the output data stream, wherein the received portion of the attachment data is smaller than the size of the attachment data, and wherein the digest value is updated as additional portions of the streamed attachment data are received and digested; and in response to sending all attachment data specified by the attachment information to the mail server, processing the signature body part to acquire a signer specified by the signer information contained in the signature body part, generating the signature data by using the signer to sign the digest value using a signer's private key, and sending the generated signature data to the mail server via the output data stream.

44. The non-transitory computer-readable memory medium according to claim 43, wherein the e-mail message has an S/MIME format, and wherein the signature data has a PKCS7 content type.

45. The non-transitory computer-readable memory medium according to claim 43, wherein the signer includes at least one of a secure e-mail library module, an application module, and a smart card.

46. The non-transitory computer-readable memory medium according to claim 43, wherein the received portion of the attachment data is encrypted before being sent to the mail server via the output data stream.

47. The non-transitory computer-readable memory medium according to claim 43, wherein the device includes a multi-function printer (MFP).

48. The non-transitory computer-readable memory medium according to claim 47, wherein the streamed attachment data is generated by at least one of a scan operation and a copy operation of the MFP.

49. The non-transitory computer-readable memory medium according to claim 43, wherein the attachment body part contains signer's digest algorithm information specified by the signer information.

50. The non-transitory computer-readable memory medium according to claim 43, wherein the received portion of the attachment data is digested using a digest algorithm that includes at least one of an MD5 (Message-Digest algorithm 5) digest algorithm, a Secure Hash Algorithm(SHA)-1 digest algorithm, and an SHA-2 digest algorithm, wherein the SHA-2 digest algorithm includes at least one of an SHA-224 digest algorithm, an SHA-256 digest algorithm, an SHA-384 digest algorithm, and an SHA-512 digest algorithm.

51. The non-transitory computer-readable memory medium according to claim 43, wherein responsive to a cancel instruction received from a user of the device, the signer specified by the signer information generates the signature data, and the generated signature data is sent to the mail server via the output data stream, such that a partially sent e-mail message is signed.

52. The non-transitory computer-readable memory medium according to claim 51, wherein information is added to the message content of the partially sent e-mail message to indicate that the message is a partially sent e-mail message.

53. The non-transitory computer-readable memory medium according to claim 51, wherein additional information is added to the attachment data of the partially sent e-mail message to indicate that the message is a partially sent e-mail message, wherein if the message includes a plurality of attachment files, the information is added to the attachment file that is partially sent.

54. The non-transitory computer-readable memory medium according to claim 51, wherein information indicating that the message is a partially sent e-mail message is added to the partially sent e-mail message as a new attachment.

55. The non-transitory computer-readable memory medium according to claim 43, wherein an application programming interface defined by a Java e-mail computing environment and an application programming interface defined by a Java object computing environment are used to send the signed e-mail message.

56. The non-transitory computer-readable memory medium according to claim 43, wherein the received portion of the read attachment data is buffered in a memory buffer, wherein a capacity of the memory buffer is smaller than a size of the attachment data specified by the attachment information, wherein the buffered portion of the attachment data is digested to generate the digest value and sent to the mail server via the output data stream, and wherein after the buffered portion of the attachment data is digested and sent to the mail server, additional portions of the streamed attachment data are buffered in the memory buffer.

* * * * *